(12) United States Patent
Jobanputra et al.

(10) Patent No.: US 10,054,686 B2
(45) Date of Patent: Aug. 21, 2018

(54) SYSTEM AND METHOD FOR REMOTE SATELLITE AND GROUND STATION CONSTELLATION MANAGEMENT

(71) Applicant: Spire Global, Inc., San Francisco, CA (US)

(72) Inventors: Roshan Jobanputra, San Francisco, CA (US); Jesse Trutna, San Francisco, CA (US); David Patterson, San Francisco, CA (US)

(73) Assignee: SPIRE GLOBAL, INC., San Francisco, CA (US)

( * ) Notice: Subject to any disclaimer, the term of this patent is extended or adjusted under 35 U.S.C. 154(b) by 290 days.

(21) Appl. No.: 14/986,085

(22) Filed: Dec. 31, 2015

(65) Prior Publication Data

US 2017/0192095 A1    Jul. 6, 2017

(51) Int. Cl.
*G01S 19/02*    (2010.01)

(52) U.S. Cl.
CPC .................................. *G01S 19/02* (2013.01)

(58) Field of Classification Search
USPC .................................. 342/357.395, 377, 409
See application file for complete search history.

(56) References Cited

U.S. PATENT DOCUMENTS

| | | |
|---|---|---|
| 4,042,882 A | 8/1977 | Camacho et al. |
| 4,117,267 A | 9/1978 | Haberle et al. |
| 4,204,127 A | 5/1980 | Carter, II |
| 4,454,510 A | 6/1984 | Crow |
| 4,618,779 A | 10/1986 | Wiscombe |
| 4,752,884 A | 6/1988 | Slafer et al. |
| 4,771,185 A | 9/1988 | Feron et al. |
| 4,897,642 A | 1/1990 | DiLullo et al. |
| 5,019,956 A | 5/1991 | Nakayama et al. |
| 5,142,217 A | 8/1992 | Gontowski, Jr. |
| 5,324,989 A | 6/1994 | Thornton |
| 5,410,728 A | 4/1995 | Bertiger et al. |
| 5,490,076 A | 2/1996 | Rawicz et al. |

(Continued)

FOREIGN PATENT DOCUMENTS

| | | |
|---|---|---|
| EP | 1037405 A2 | 9/2000 |
| EP | 2824479 A1 | 1/2015 |
| WO | 2014121197 A2 | 8/2014 |

OTHER PUBLICATIONS

International Search Report and Written Opinion dated Feb. 21, 2017, issued in corresponding PCT International Application No. PCT/US2016/058037.

(Continued)

*Primary Examiner* — Harry K Liu
(74) *Attorney, Agent, or Firm* — Troutman Sanders LLP

(57) ABSTRACT

The disclosed technology relates to systems and methods for managing one or more ground stations that track satellites. A non-transitory computer-readable storage medium stores information of a ground station at a first position at a first time. A processor receives from a sensor information of the ground station at a second position at a second time. The processor detects an anomaly of a positional characteristic of the ground station based on a difference between the first position and the second position. The processor outputs an instruction to calibrate the ground station based on the detected anomaly.

56 Claims, 24 Drawing Sheets

(56) References Cited

U.S. PATENT DOCUMENTS

| | | | |
|---|---|---|---|
| 5,592,394 A | 1/1997 | Wiscombe | |
| 5,604,920 A | 2/1997 | Bertiger et al. | |
| 5,708,589 A | 1/1998 | Beauvais | |
| 5,752,047 A | 5/1998 | Darty et al. | |
| 5,770,895 A | 6/1998 | Kumasaka | |
| 5,940,739 A | 8/1999 | Conrad et al. | |
| 5,963,166 A | 10/1999 | Kamel | |
| 5,969,670 A | 10/1999 | Kalafus et al. | |
| 5,995,497 A | 11/1999 | Gerakoulis | |
| 6,023,291 A | 2/2000 | Kamel et al. | |
| 6,067,453 A | 5/2000 | Adiwoso et al. | |
| 6,096,502 A | 8/2000 | Lee | |
| 6,271,877 B1 | 8/2001 | LeCompte | |
| 6,324,380 B1 | 11/2001 | Kiuchi et al. | |
| 6,356,966 B1 | 3/2002 | Loach et al. | |
| 6,381,228 B1 | 4/2002 | Prieto, Jr. et al. | |
| 6,535,798 B1 | 3/2003 | Bhatia et al. | |
| 6,567,041 B1 | 5/2003 | O'Dell | |
| 6,584,452 B1 | 6/2003 | Prieto, Jr. et al. | |
| 6,587,075 B1* | 7/2003 | Loh .................... | G01S 19/02 342/357.57 |
| 6,718,213 B1 | 4/2004 | Enberg | |
| 6,819,011 B2 | 11/2004 | Kernahan et al. | |
| 7,007,179 B2 | 2/2006 | Mares et al. | |
| 7,020,790 B2 | 3/2006 | Mares | |
| 7,162,653 B2 | 1/2007 | Mares et al. | |
| 7,184,762 B2 | 2/2007 | Nishinaga et al. | |
| 7,228,206 B2 | 6/2007 | Kahle et al. | |
| 7,262,943 B2 | 8/2007 | Stellato et al. | |
| 7,327,989 B2 | 2/2008 | Levinberg | |
| 7,366,125 B1 | 4/2008 | Elliott | |
| 7,428,405 B2 | 9/2008 | Kim et al. | |
| 7,503,511 B2 | 3/2009 | Mueller | |
| 7,781,908 B2 | 8/2010 | DuBose et al. | |
| 7,852,855 B1 | 12/2010 | Gooding et al. | |
| 7,949,038 B2 | 5/2011 | Avellone et al. | |
| 8,032,073 B2 | 10/2011 | Youssefzadeh et al. | |
| 8,068,937 B2 | 11/2011 | Eaves | |
| 8,078,141 B2 | 12/2011 | Wahlberg et al. | |
| 8,204,632 B2 | 6/2012 | Abi-Samra | |
| 8,274,925 B2 | 9/2012 | Jacks | |
| 8,290,484 B2 | 10/2012 | Calmettes et al. | |
| 8,306,385 B2 | 11/2012 | Hino et al. | |
| 8,335,574 B2 | 12/2012 | Middlemiss | |
| 8,378,913 B2 | 2/2013 | Tao et al. | |
| 8,411,969 B1 | 4/2013 | Joslin et al. | |
| 8,447,295 B2 | 5/2013 | Palmer et al. | |
| 8,482,610 B2 | 7/2013 | do Carmo Miranda | |
| 8,487,996 B2 | 7/2013 | Mann et al. | |
| 8,494,684 B2 | 7/2013 | Yamamori et al. | |
| 8,527,106 B2 | 9/2013 | Muneshima et al. | |
| 8,531,524 B2 | 9/2013 | do Carmo Miranda | |
| 8,600,292 B2 | 12/2013 | Jalali | |
| 8,670,707 B2 | 3/2014 | Fleeter et al. | |
| 8,712,322 B2 | 4/2014 | Youssefzadeh et al. | |
| 8,754,547 B2 | 6/2014 | Jin et al. | |
| 8,781,639 B2 | 7/2014 | Li et al. | |
| 2002/0108065 A1 | 8/2002 | Mares | |
| 2003/0069691 A1 | 4/2003 | Schroeder | |
| 2003/0095367 A1 | 5/2003 | Mares et al. | |
| 2003/0217362 A1 | 11/2003 | Summers et al. | |
| 2004/0008034 A1 | 1/2004 | Mastoris et al. | |
| 2004/0082298 A1 | 4/2004 | Chen | |
| 2004/0117077 A1 | 6/2004 | Kahle et al. | |
| 2004/0226046 A1 | 11/2004 | Weng et al. | |
| 2004/0263386 A1 | 12/2004 | King et al. | |
| 2005/0057870 A1 | 3/2005 | Stellato et al. | |
| 2006/0101296 A1 | 5/2006 | Mares et al. | |
| 2006/0282724 A1 | 12/2006 | Roulo | |
| 2007/0182628 A1 | 8/2007 | Pomerantz et al. | |
| 2008/0071633 A1 | 3/2008 | Ozkan et al. | |
| 2008/0086509 A1 | 4/2008 | Wallace | |
| 2009/0007240 A1 | 1/2009 | Vantalon et al. | |
| 2009/0087029 A1 | 4/2009 | Coleman et al. | |
| 2009/0290534 A1 | 11/2009 | Connors et al. | |
| 2010/0158138 A1 | 6/2010 | Ryu et al. | |
| 2011/0023578 A1 | 2/2011 | Grässer | |
| 2011/0116441 A1 | 5/2011 | Wyler | |
| 2011/0143695 A1 | 6/2011 | Lee et al. | |
| 2011/0170797 A1 | 7/2011 | Johnson | |
| 2012/0013506 A1 | 1/2012 | Halavi et al. | |
| 2012/0018585 A1 | 1/2012 | Liu et al. | |
| 2012/0274303 A1 | 11/2012 | Yamamori et al. | |
| 2012/0293678 A1* | 11/2012 | Amor Molares ...... | H04N 5/772 348/222.1 |
| 2013/0018529 A1 | 1/2013 | Ploschnitznig | |
| 2013/0051661 A1 | 2/2013 | Robinson et al. | |
| 2013/0184890 A1 | 7/2013 | Li et al. | |
| 2013/0235234 A1 | 9/2013 | Cucci et al. | |
| 2013/0268232 A1 | 10/2013 | Poduri et al. | |
| 2013/0271628 A1 | 10/2013 | Ku et al. | |
| 2013/0298083 A1 | 11/2013 | Bertoldo et al. | |
| 2014/0015970 A1 | 1/2014 | do Carmo Miranda | |
| 2014/0027576 A1 | 1/2014 | Boshuizen et al. | |
| 2014/0039729 A1 | 2/2014 | Puig-Suari et al. | |
| 2014/0039963 A1 | 2/2014 | Augenstein et al. | |
| 2014/0040282 A1 | 2/2014 | Mann et al. | |
| 2014/0059166 A1 | 2/2014 | Mann et al. | |
| 2014/0118256 A1 | 5/2014 | Sonoda et al. | |
| 2014/0218242 A1 | 8/2014 | Platzer | |
| 2014/0222472 A1 | 8/2014 | Platzer | |
| 2015/0116147 A1 | 4/2015 | Jaeckle | |
| 2015/0146019 A1 | 5/2015 | Aoyama | |
| 2015/0162656 A1* | 6/2015 | Fitz-Coy ................ | H01Q 1/288 343/705 |
| 2015/0199556 A1 | 7/2015 | Qian et al. | |
| 2015/0346722 A1* | 12/2015 | Herz .................... | G05D 1/0038 701/2 |
| 2015/0372380 A1* | 12/2015 | Judd .................... | H01Q 3/02 375/211 |
| 2016/0365629 A1* | 12/2016 | Yao .................... | H01Q 1/1257 |

OTHER PUBLICATIONS

International Search Report and Written Opinion dated Apr. 27, 2016 issued in corresponding PCT International Application No. PCT/US2015/054906.

International Search Report dated Feb. 24, 2016, issued in corresponding Application No. PCT/US2015/054889.

Canopus Systems, CubeSat Deployable Low Frequency Monopole Antenna, NASA Ames Research Park, Bldg. 19 Room 2077 Moffet Field, CA 94035, www.canopus-us.com, V1.0, Aug. 16, 2010.

European Search Report dated Jul. 22, 2016 issued in corresponding European Patent Application No. 14745871.5.

Bao Han, "Design a Nano-Satellite for Observation of Transient Lunar Phenomena (TLP)", Lulea University of Technology—Master's Thesis, Sep. 24, 2009.

International Search Report dated Jan. 27, 2015, issued in corresponding Application No. PCTUS1414445.

Carson-Jackson ("Statellite AIS—Developing Technology or Existing Capability?", The Journal of Navigation (2012), 65, 303-321).

\* cited by examiner

Monit Status

| Id | | Hostname | Events | CPU | Mem | Status | StatusId | Heartbeat |
|---|---|---|---|---|---|---|---|---|
| 5 | 2 | calliope | 233 | 6 | 37.3 | All 4 services are available | 0 | 1 |
| 81 | 1 | FLGS | 124 | 0 | 3.3 | 4 out of 5 services are available | 0 | 1 |
| 15291 | 1 | HIGS | 114 | 0 | 1.6 | 4 out of 5 services are available | 0 | 1 |
| 220 | 2 | CTGS | 638 | 0 | 2.2 | All 5 services are available | 0 | 1 |
| 490 | 2 | COGS | 165 | 0 | 5.3 | All 5 services are available | 0 | 1 |
| 23 | 1 | TXGS | 182 | 7.4 | 4.7 | 3 out of 5 services are available | 0 | 1 |
| 493 | 2 | protogs-aries | 140 | 0 | 8.5 | All 5 services are available | 0 | 1 |
| 39 | 2 | SFGS | 250 | 0 | 12 | All 5 services are available | 0 | 1 |
| 45 | 2 | ANKGS | 1565 | 0.3 | 7.3 | All 5 services are available | 0 | 1 |
| 48 | 1 | JAKGS | 142 | 0 | 5.1 | 4 out of 5 services are available | 0 | 1 |
| 20493 | 1 | ZOOOGS | 72 | 0 | 5.9 | 4 out of 5 services are available | 0 | 1 |

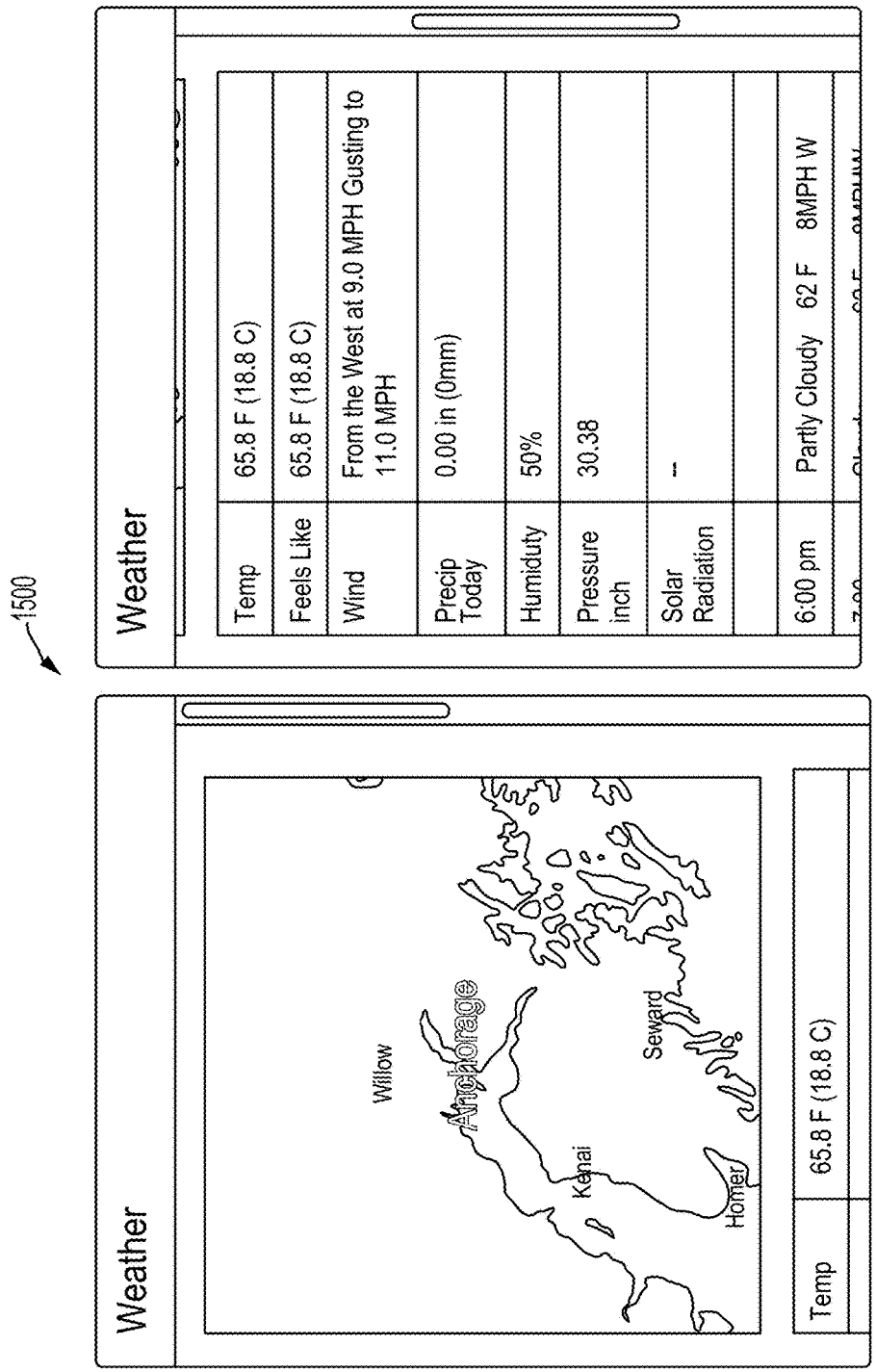

2000

Start

2002 Receive, by a processor, a satellite's position

2004 Receive, by the processor, from a sensor, information of the reception device including positional information of the reception device

2006 Determine, by the processor, a line of sight of the reception device based on the received information

2008 Determine, by the processor, a predicted path of the satellite relative to the line of sight of the reception device

2010 Output for display a polar coordinates graph illustrating the satellite's position and the predicted path of the satellite relative to the line of sight of the reception device End

FIG. 20

SYSTEM AND METHOD FOR REMOTE SATELLITE AND GROUND STATION CONSTELLATION MANAGEMENT

CROSS REFERENCE TO RELATED PATENT APPLICATIONS

This disclosure incorporates by reference the following pending U.S. patent applications: (1) U.S. Ser. No. 13/757,062 ("'062 application"), entitled, "System And Method For Widespread Low Cost Orbital Satellite Access" and filed on Feb. 1, 2013; (2) U.S. Ser. No. 14/632,656, title: System and Method for Power Distribution in an Autonomous Modular System, filed on Feb. 26, 2015; (3) U.S. Ser. No. 14/632,535, entitled "Processor system for control of modular autonomous system, filed on Feb. 26, 2015; and (4) U.S. Ser. No. 14/632,588, entitled "System and method for communication with autonomous system in multiple bands," filed on Feb. 26, 2015. The contents of these applications are incorporated by reference herein as if each was restated in full.

FIELD OF THE INVENTION

The inventions herein are directed to novel systems and methods for ground station and satellite constellation management. In particular, the present invention is directed to systems and method for presenting important information regarding satellites and ground stations through a comprehensive remote management dashboard to facilitate a user's decision making process.

BACKGROUND

A growing interest in miniaturized satellites, having a small form factor launched into low earth orbit (LEO), has led to an increase in both launches of the vehicles and the recognition that earlier techniques for control thereof are inadequate. Due to their smaller size, miniaturized satellites generally cost less to build and deploy into orbit. This allows for large numbers of satellites to be deployed into a constellation and at frequent intervals. As a result, they present unique opportunities for educational institutions, governments, and commercial entities to launch and deploy satellites for a variety of purposes with fewer costs compared to traditional, large satellites. The frequent launch intervals also afford the opportunity to upgrade and specialize satellites within the constellation as hardware advances and/or the mission tasks evolve.

Ground stations on Earth communicate with satellites in orbit—downloading data from satellites and/or transmitting data related to satellite control, task programming and other information. Radio antennas installed at ground stations send and receive radio waves to facilitate these data transmissions.

Due to the LEO of miniaturized satellites the visible time of these satellites from a single, stationary ground station is relatively short. With a satellite in a high inclination orbit, a ground station close to the equator could yield as low as 2 passes of the satellite per 24-hour cycle. Thus, it is important to achieve a strong communication channel to optimally exploit the narrow window afforded by LEO satellites. To this end, ground station antennas are directionally configured with a high gain profile (narrow beam width) (e.g., Yagi, Yagi-Uda) to maximize the radio signal strength and allow for high data transfer speeds.

Ground station antennas are typically mounted on motorized azimuth and elevation rotators (rotors) to maintain the optimal orientation with respect to a satellite by tracking it as it traverses across the sky. This facilitates optimal contact time and clarity between the ground station and the satellite. Changes to azimuth and elevation orientation of the antennas are controlled by a rotor controller.

Antenna rotors are installed and calibrated to known elevation and azimuth values to allow for consistent and accurate adjustments. Over time, through mechanical and environmental stresses imposed on the antenna structure and mechanisms, the rotors eventually drift from their original calibration. This results in inaccurate adjustments to the antenna orientation and satellite tracking, and thus poor ground station-to-satellite communication. Rotors may be manually corrected to compensate for such drift, but this requires on-site visits for each adjustment. The time and cost of on-site calibration of an entire network of ground stations is not sustainable under a low-cost satellite model, or would at least negate the low-cost benefits.

In addition, implementing new ground station hardware is expensive and time consuming. Thus, an improvement can be made to better leverage existing assets and data feeds to solve the above issues and still maintain a low-cost.

SUMMARY

The disclosed technology relates to satellite constellation and ground station management. The overall object of the invention is to provide a user interface on a remote user's client computing device with a comprehensive toolset to analyze data related to a satellite constellation and to manage important aspects of one or more ground stations.

Another object of the invention is to facilitate the remote management of one or more ground stations from a user's client computing device. Thus, in a preferred embodiment, the user interface can be presented in a location remote from one or more ground stations through a network link (e.g., over a web-based protocol). User input, ground station data and satellite data may then be transmitted between a ground station and a remote user. This has the added benefit of allowing multiple users to manage the same ground station through their respective user interfaces.

Another object of the invention is to allow for the remote calibration and/or adjustment of ground station antennas remote from a user's client computing device. Thus, in a preferred embodiment, the user interface provides a module for determining a ground station antenna orientation (i.e., azimuth and elevation) and to receive input through a remote user's client computing device related to calibration or orientation adjustment instructions. In this embodiment, the inputted instructions are transmitted through the network link to the proper ground station where they are executed by the rotor controller.

Other aspects of the invention provide additional ground station and satellite data through the user interface to aid in management decisions.

In one embodiment, a real time or near real-time video feed of a ground station antenna is transmitted to the user interface, providing the visual status of the antenna and the immediately surrounding environment. With this information, a user can quickly assess the structural condition of the antenna, as well as its general orientation. In another embodiment, the user can also access historical snapshot images or video recordings of an antenna to determine whether and how its condition has changed over time. Continuing with this embodiment, a historical snap image may appear as a digital overlay on the real time video to provide a reference point to the user for making calibration adjustments.

In another embodiment, computer vision analysis of historical images is employed to make an accurate calculation of changes to the antenna's original or preferred positioning. The user can use this determination to input calibration instructions for transmission to the ground station's rotor controller.

In another embodiment, the user interface includes information regarding one or more satellites. This information can include real-time or near real-time geolocation and orbit path data of one or more satellites.

In another embodiment, the user interface includes information regarding one or more ground stations. This information can include real time or near real-time status data and geolocation data of one or more ground stations.

In another embodiment, the user interface includes information related to the local weather for one or more ground stations.

One aspect of the present technology relates to a system for managing a ground station that tracks a satellite. The system may include a non-transitory computer-readable storage medium configured to store information of the ground station at a first position at a first time. A processor may be in communication with the non-transitory computer-readable storage medium. The processor may receive, from a sensor, information of the ground station at a second position at a second time. In one example, the received information may be visual information. The processor may output an instruction to store the information of the ground station at the second position at the second time in the non-transitory computer-readable storage medium to develop a time based record of the ground station. The processor may detect an anomaly of a positional characteristic of the ground station based on a difference between the first position and the second position. The processor may determine a need to calibrate the ground station based on the detected anomaly. The processor may output a signal indicative of the determined need. In one example, the processor may output the signal to alert an operator to the anomaly for possible further action. In another example, the processor may output the signal to calibrate the ground station.

Another aspect of the present technology relates to a method for managing a ground station that tracks a satellite. The method may include storing, by a non-transitory computer-readable storage medium, information of the ground station at a first position at a first time. The method may also include receiving, by a processor, the stored information of the ground station at the first position. The processor may receive, from a sensor, information of the ground station at a second position at a second time. In one example, the received information may be visual information. The processor may output an instruction to store the information of the ground station at the second position at the second time in the non-transitory computer-readable storage medium to develop a time based record of the ground station. The processor may detect an anomaly of a positional characteristic of the ground station based on a difference between the first position and the second position. The processor may determine a need to calibrate the ground station based on the detected anomaly. The processor may output a signal indicative of the determined need. In one example, the processor may output the signal to alert an operator to the anomaly for possible further action. In another example, the processor may output the signal to calibrate the ground station.

One aspect of the present technology relates to a system for providing a graphical display of information related to a satellite reception device. The reception device may change from a first position at a first time to a second position at a second time. The system may include a non-transitory computer-readable storage medium configured to store information of the reception device at the first position. A processor may be in communication with the non-transitory computer-readable storage medium. The processor may receive, from the non-transitory computer-readable storage medium, the stored information of the reception device at the first position. The processor may receive, from a sensor, information of the reception device at the second position. In one example, the received information may be visual information. The processor may construct a visual representation of the reception device at the first position and the reception device at the second position in an overlay manner. The processor may output for display the visual representation.

Another aspect of the present technology relates to a method for providing a graphical display of information related to a satellite reception device that changes from a first position at a first time to a second position at a second time. The method may include storing, by a non-transitory computer-readable storage medium, information of the reception device at the first position. The method may also include receiving, by a processor, the stored information of the reception device at the first position. The processor may receive, from a sensor, information of the reception device at the second position. In one example, the received information may be visual information. The processor may construct a visual representation of the reception device at the first position and the reception device at the second position in an overlay manner. The processor may output for display the visual representation.

One aspect of the present technology relates to a system for providing a graphical display to manage a satellite reception device that tracks a satellite. The reception device may define a field of view within which the reception device receives radio waves from the satellite. The system may include a processor configured to receive a satellite's position. The processor may receive, from a sensor, information of the reception device including positional information of the reception device. In one example, the received information may be visual information. In another example, the processor may cross-correlate with streaming logs which may provide information on link quality. Based on such information, the processor may determine accuracy of positional information of the reception device. In some examples, the processor may cross-correlate with live satellite tracking information to determine accuracy of the positional information of the reception device. The processor may determine a field of view of the reception device based on the received information. The processor may determine a predicted path of the satellite relative to the field of view of the reception device. The processor may output for display a polar coordinates graph illustrating the satellite's position and the predicted path of the satellite relative to the field of view of the reception device.

Another aspect of the present technology relates to a method for providing a graphical display to manage a satellite reception device that tracks a satellite. The reception device may define a field of view within which the reception device receives radio waves from the satellite. The method may include receiving, by a processor, a satellite's position. The processor may receive, from a sensor, information of the reception device including positional information of the reception device. In one example, the received information may be visual information. The processor may determine a field of view of the reception device based on the received information. The processor may determine a predicted path of the satellite relative to the field of view of the reception device. The processor may output for display a polar coordinates graph illustrating the satellite's position and the predicted path of the satellite relative to the field of view of the reception device.

One aspect of the present technology relates to a system for providing a graphical display of information related to a plurality of ground stations. The system may include a non-transitory computer-readable storage medium configured to store information of the plurality of ground stations. The stored information may relate to information of a plurality of positions exhibited by each ground station throughout a time frame. In one example, the stored information may relate to visual information of the plurality of positions exhibited by each ground station throughout the time frame. The system may include a processor in communication with the non-transitory computer-readable storage medium. The processor may receive an input by a user selecting at least one ground station. The processor may receive an input by the user selecting a point in the time frame associated with the selected ground station. The processor may retrieve from the non-transitory computer-readable storage medium a position of the selected ground station corresponding to the selected point in the time frame. The processor may output for display a visual representation of the selected ground station exhibiting the retrieved position at the selected point in the time frame.

Another aspect of the present technology relates to a method for providing a graphical display of information related to a plurality of ground stations. The method may include storing, by a non-transitory computer-readable storage medium, information of the plurality of ground stations. The stored information may relate to information of a plurality of positions exhibited by each ground station throughout a time frame. In one example, the stored information may relate to visual information of the plurality of positions exhibited by each ground station throughout the time frame. The method may also include receiving, by a processor, an input by a user selecting at least one ground station. The processor may receive an input by the user selecting a point in the time frame associated with the selected ground station. The processor may retrieve from the non-transitory computer-readable storage medium a position of the selected ground station corresponding to the selected point in the time frame. The processor may output for display a visual representation of the selected ground station exhibiting the retrieved position at the selected point in the time frame.

One aspect of the present technology relates to a system for providing a graphical display of information related to a plurality of satellite reception devices. The system may include a non-transitory computer-readable storage medium configured to store information of the plurality of satellite reception devices. The stored information may include a location of each satellite reception device. The system may also include a processor in communication with the non-transitory computer-readable storage medium. The processor may receive, from the non-transitory computer-readable storage medium, the location of each satellite reception device. The processor may output for display a distribution of the satellite reception devices in a geographical map based on the location of each satellite reception device. The satellite reception devices may be, for example, ground stations.

Another aspect of the present technology relates to a method for providing a graphical display of information related to a plurality of satellite reception devices. The method may include storing, by a non-transitory computer-readable storage medium, information of the plurality of satellite reception devices. The stored information may include a location of each satellite reception device. A processor may receive, from the non-transitory computer-readable storage medium, the location of each satellite reception device. The processor may output for display a distribution of the satellite reception devices in a geographical map based on the location of each satellite reception device.

One aspect of the present technology relates to a system for providing a graphical display of ground station information. The system may include a non-transitory computer-readable storage medium configured to store information related to a plurality of ground stations. Each ground station may provide at least one service in connection with satellite reception. The system may include a processor in communication with the non-transitory computer-readable storage medium. The processor may receive, from the plurality of ground stations, information related to availability of each service provided by each ground station. The processor may output an instruction to store service availability of each ground station in the non-transitory computer-readable storage medium. The processor may output for display status of the plurality of ground stations. The displayed status may include the service availability of each ground station.

Another aspect of the present technology relates to a method for providing a graphical display of ground station information. The method may include storing, by a non-transitory computer-readable storage medium, information related to a plurality of ground stations. Each ground station may provide at least one service in connection with satellite reception. The method may also include receiving, by a processor, from the plurality of ground stations, information related to availability of each service provided by each ground station. The processor may output an instruction to store service availability of each ground station in the non-transitory computer-readable storage medium. The processor may output for display status of the plurality of ground stations. The displayed status may include the service availability of each ground station.

Various aspects of the described example embodiments may be combined with aspects of certain other example embodiments to realize yet further embodiments. It is to be understood that one or more features of any one example may be combined with one or more features of the other example. In addition, any single feature or combination of features in any example or examples may constitute patentable subject matter. Other features of the technology will be apparent from consideration of the information contained in the following detailed description.

BRIEF DESCRIPTION OF THE DRAWINGS

The following Detailed Description of the technology is better understood when read in conjunction with the appended drawings. For the purposes of illustration, there is shown in the drawings exemplary embodiments, but the subject matter is not limited to the specific elements and instrumentalities disclosed. Components in the figures are shown for illustration purposes only, and may not be drawn to scale.

FIG. 14 illustrates a graphical display of status of monitored ground stations according to one aspect of the present technology.

FIG. 15 illustrates a graphical display of weather information according to one aspect of the present technology.

FIG. 20 is a flowchart illustrating example steps that may be executed by a computing device to provide a graphical display to manage a satellite reception device that tracks a satellite.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Satellite Constellation and Ground Station Network

Figure 1:
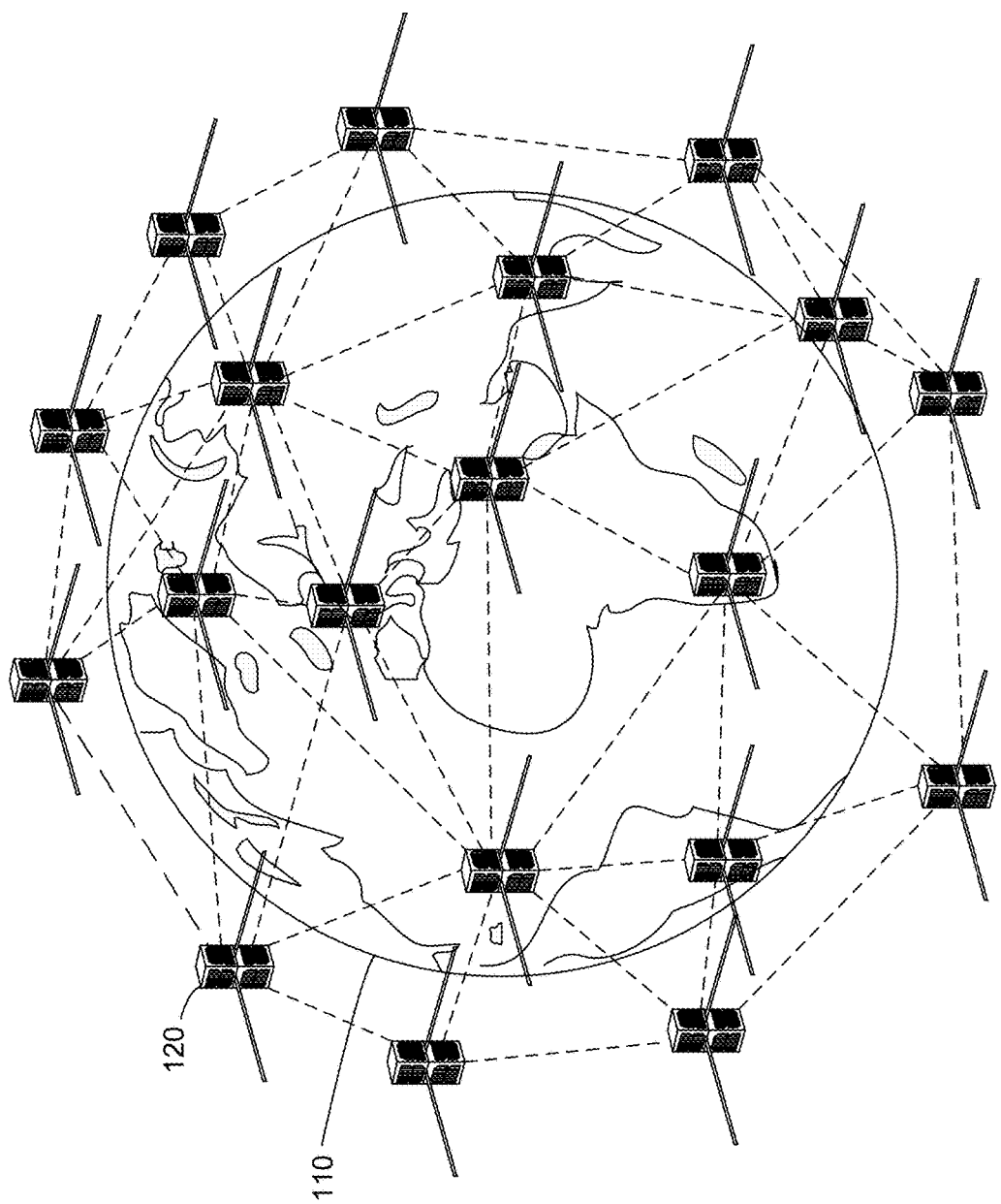
FIG. 1 illustrates an example terrestrial and orbital communication network according to one aspect of the disclosed technology.

The present application relates to, but not limited to, a terrestrial and orbital communication network having a constellation of satellites. FIG. 1 illustrates an exemplary terrestrial and orbital communication network 100 covering at least a portion of a planet 110, such as the Earth. The network 100 may include a constellation of satellites 120 each configured to collect data from a point on the planet from time to time or on a regular basis.

The satellite 120 can be a miniature satellite in any small form factor (e.g., small satellite, microsatellite, nanosatellite, picosatellite, femtosatellite, etc.). In one embodiment, the satellite 120 may be based on an industry standard for "cubesats," developed in 2001 by Stanford University and California Polytechnic Institute and described in the document "CubeSat Design Specification."

Figure 2:
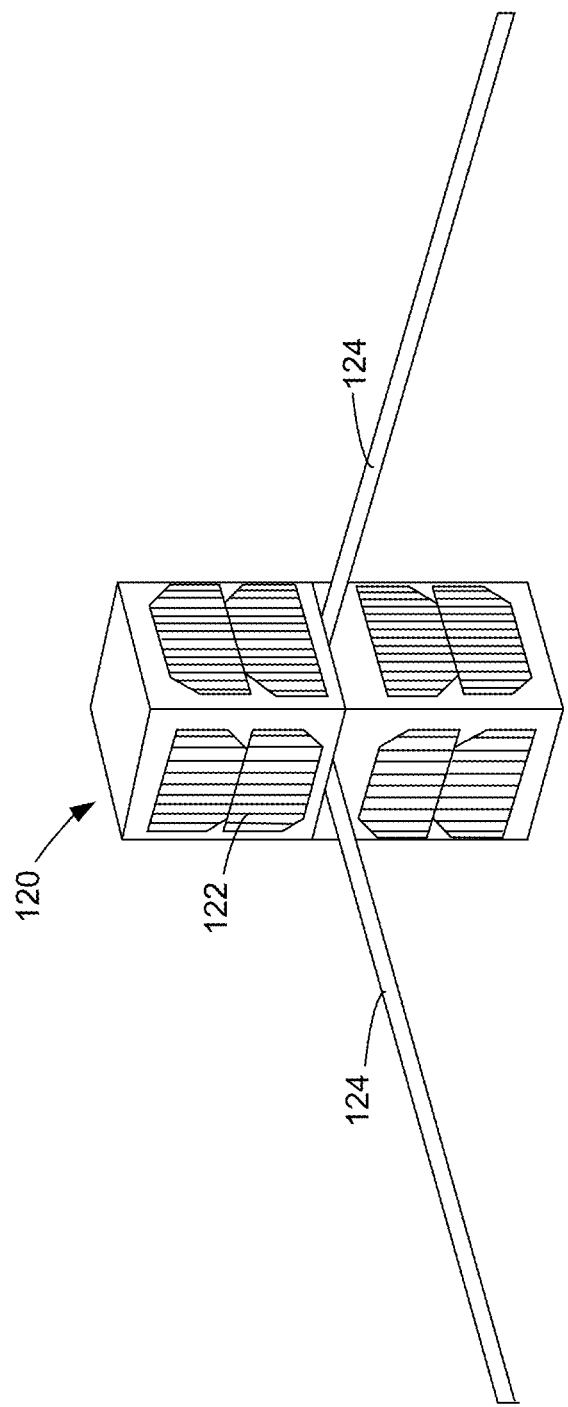
FIG. 2 is a perspective view of a satellite according to one aspect of the disclosed technology.

FIG. 2 is a perspective view of a satellite 120 according to one aspect of the disclosed technology. As shown in FIG. 2, the satellite 120 may include one or more solar panels 122. The solar panels 122 may be configured to provide electrical energy to one or more components contained within the satellite 120. The satellite 120 may also include one or more antennas 124 that may extend when fully deployed.

Figure 3:
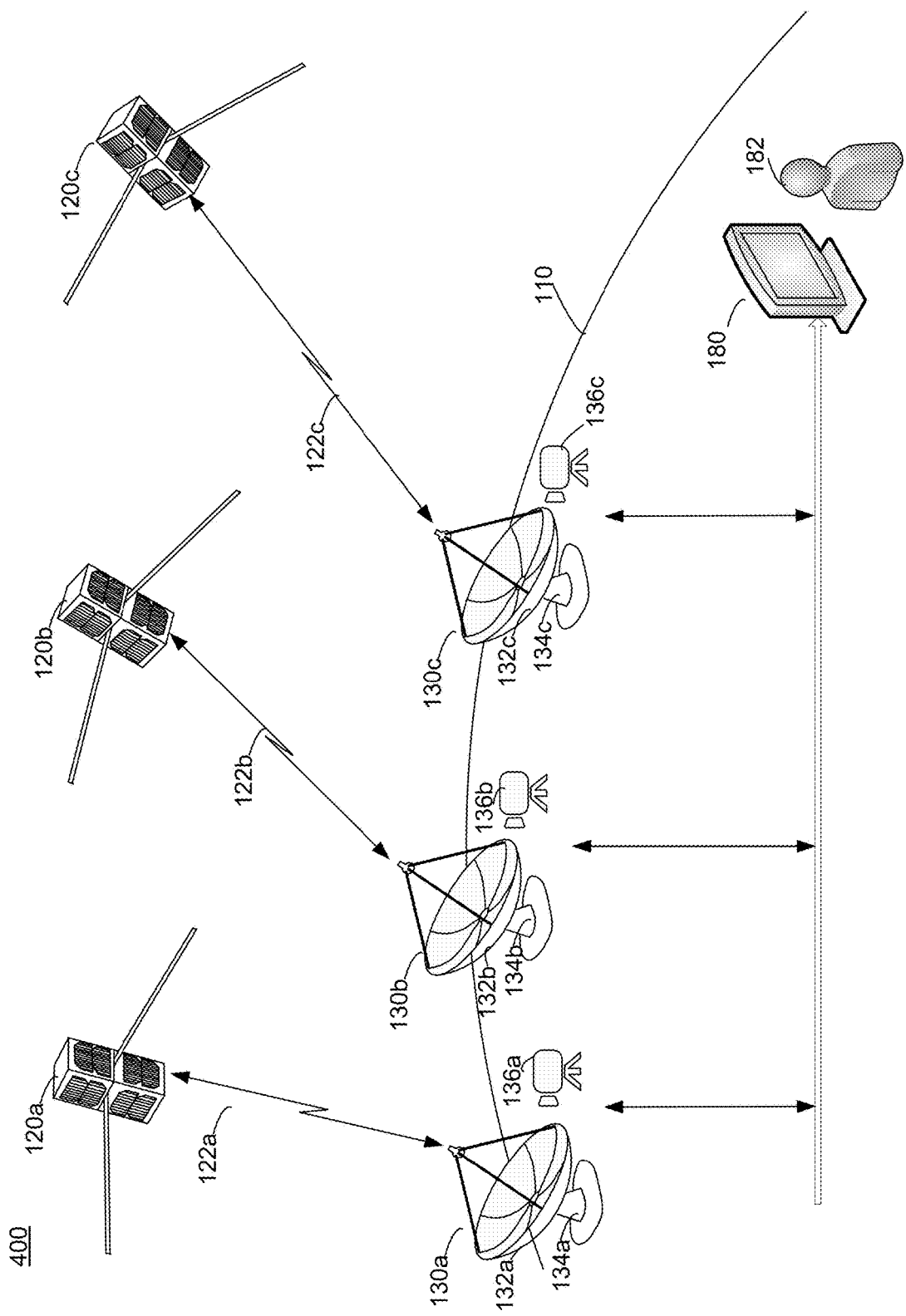
FIG. 3 illustrates communications between satellites, ground stations and a computing device according to one aspect of the present technology.

Each satellite 120 may communicate with one or more ground stations via one or more transmission links. Each ground station may communicate with one or more satellites 120. With reference to FIG. 3, satellites 120a, 120b and 120c may communicate with ground stations 130a, 130b and 130c via transmission links 122a, 122b and 122c, respectively. Each transmission link may include an uplink, downlink or a combination thereof.

Figure 4:
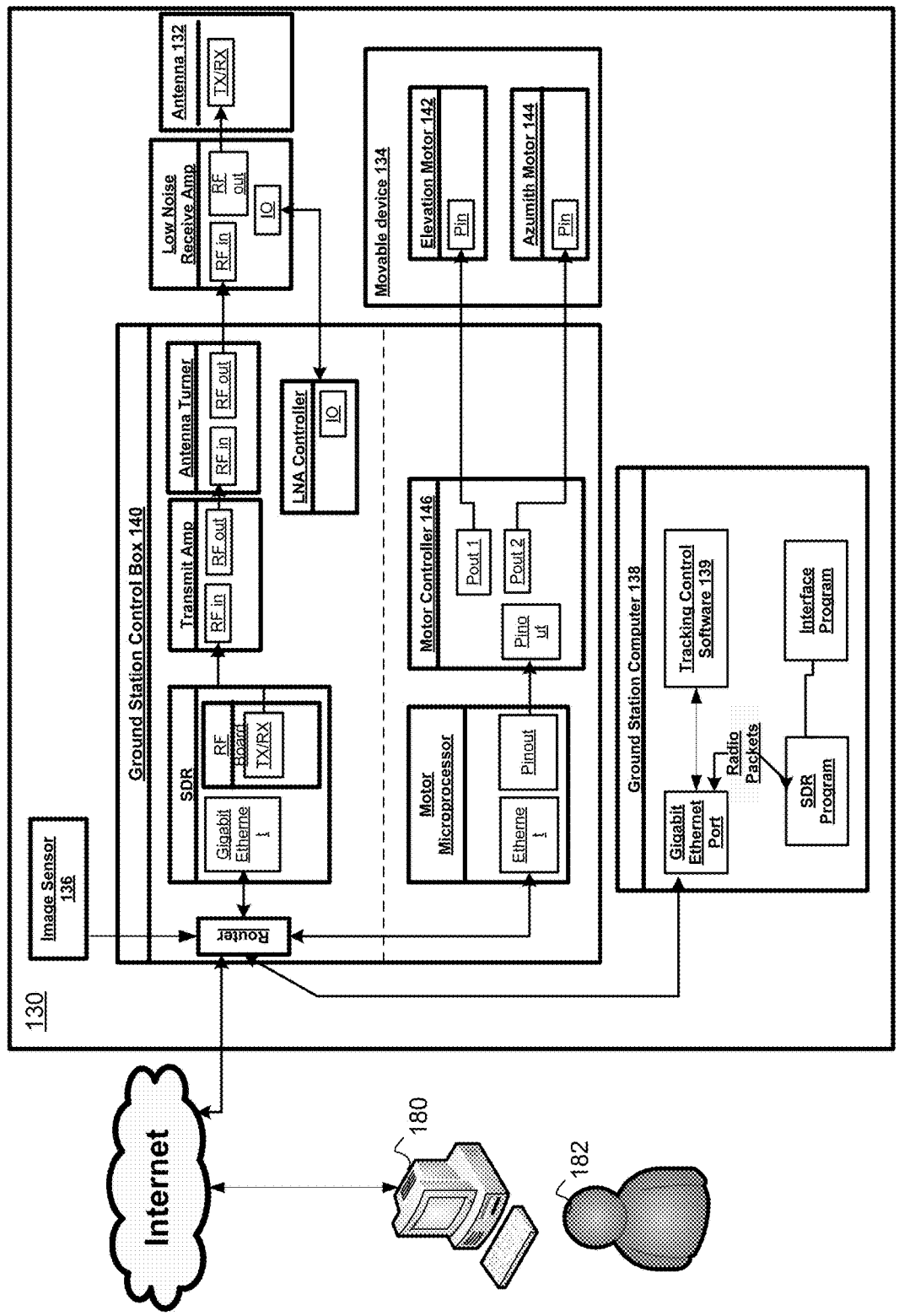
FIG. 4 provides a block diagram of a ground station configuration according to one aspect of the present technology.

FIG. 4 provides a block diagram of an exemplary ground station configuration. As illustrated, the ground station 130 may include one or more of the following: an antenna 132, a movable device 134 such as a rotor, an image sensor 136, a ground station computer 138, and a ground station control box 140.

With reference to FIGS. 3-4, the ground station 130 (e.g., 130a-c) may include an antenna 132 (e.g., 132a-c) for receiving radio waves from a satellite 120 (e.g., 120a-c). The antenna 132 may be mounted on a movable device 134 (e.g., 134a-c). The movable device may be a rotator or rotor that adjusts orientation of the ground station 130 or the antenna 132. Each ground station may have a field of view within which the ground station may receive radio waves from the satellite 120. The field of view depends on the ground station's orientation. Based on the movable device 134, the ground station 130 may maintain an optimal field of view to capture radio waves of the satellite 120.

The movable device 134 may adjust azimuth and elevation of the ground station or antenna 132. The movable device 134 may include an elevator motor 142 (e.g., Yaesu G-5500) and an azumith motor 144. Changes to azimuth and elevation of the antenna 132 may be controlled by a motor controller 146. In one embodiment, the motor controller 146 may receive instructions from a local or remote computing device 180 as to how to calibrate the movable device 134. The instructions may be transmitted via a network link or Internet. The computing device 180 may be operated by a user 182.

Each ground station 130 may include one or more image sensors 136 (e.g., 136a-c) positioned on site to capture live images or videos of the ground station 130 so as to provide diagnostic capabilities. The image sensor 136 may be a camera, such as a digital video camera. In one embodiment, at least one image sensor 136 may be directed at the antenna system to capture the antenna orientation and visual condition. The image sensor 136 may capture images or videos of the movable device 134 at the ground station 130.

The feed from each image sensor 136 may be made available to local and remote users. In one example, the feed may be first routed to the ground station computer 138. The ground station computer 138 may make the feed available to local and remote users through the Internet or other network link. Alternatively, each image sensor 136 may be configured to allow access to its feed directly or through another intermediary, such as a cloud service or other external database. The feed may be processed in real time or stored in a memory for later review and processing.

Visual information captured by the image sensor 136 may be transmitted to the computing device 180. The computing device 180 may analyze the visual information to determine the position of the ground station 130 or the movable device 134. For example, the computing device 180 may determine azimuth and elevation of the ground station 130, the movable device 134 or the antenna 132. The computing device 180 may determine how to calibrate the ground station, the movable device or the rotor, or the antenna based on the analysis. By way of example, the computing device 180 may send instructions to the motor controller 146 about how to calibrate the movable device 134.

The ground station computer 138 may include a tracking software 139. The tracking software 139 may translate tracking instructions into azimuth and elevation control data to properly orient the antenna 132. Alternatively, the tracking instructions may also include azimuth and elevation control data. The control box 140 may include an antenna control system. The antenna control system may receive control data from the ground station computer 138.

Figure 5:
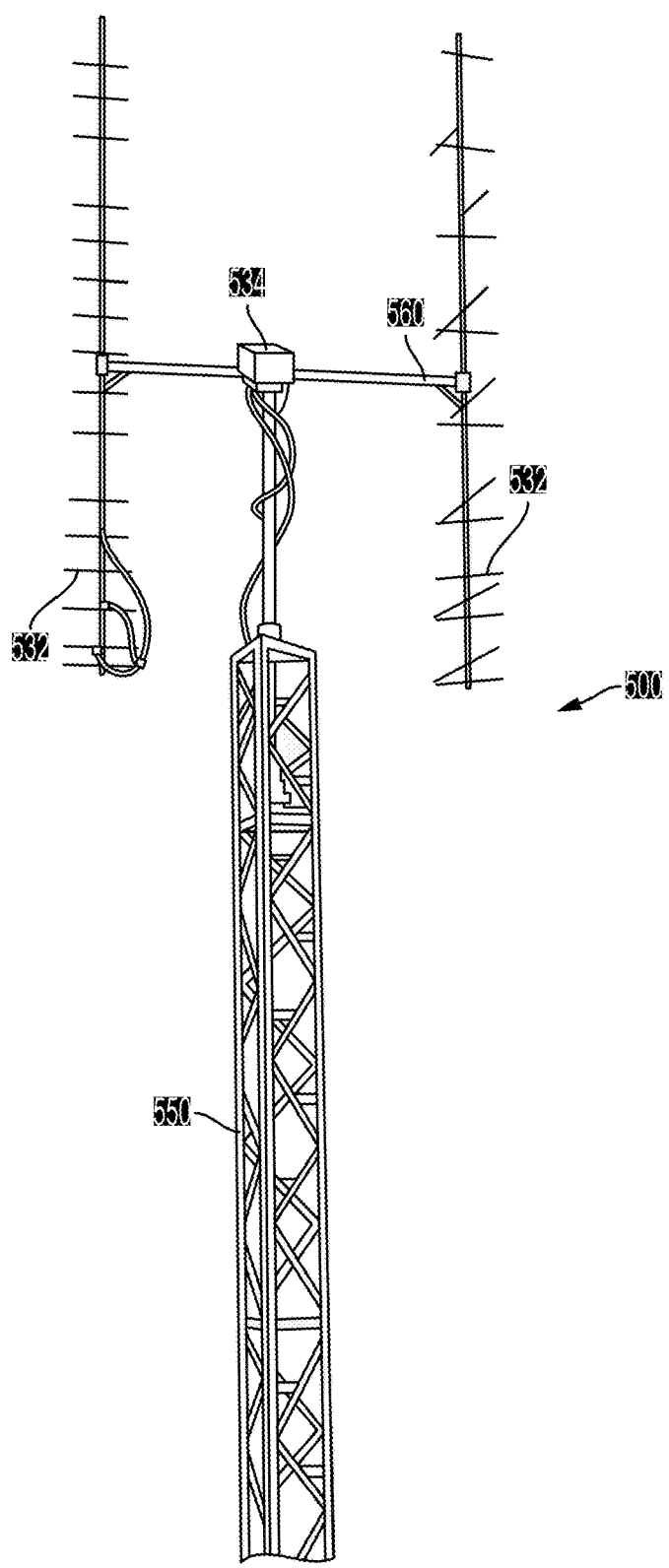
FIG. 5 illustrates an exemplary antenna system installed at a ground station according to one aspect of the present technology.

FIG. 5 illustrates an exemplary antenna system 500 installed at a ground station. A rigid mast 550 may be secured in a substantially vertical position, and may provide a main support for the antenna system 500. An integrated azimuth and elevation rotor unit 534 may be mounted to the top end of the mast 550. One or more antenna booms 560 may be affixed horizontally to the elevation rotor receptacles. Antennas 532 may be mounted to the ends of the antenna booms 560. Adjustments to the rotational position of the azimuth and elevation rotors 534 may result in a corresponding adjustment to the azimuth and elevation orientation of the antennas 532.

Satellite Constellation & Ground Station Network Management Dashboard

Figure 6:
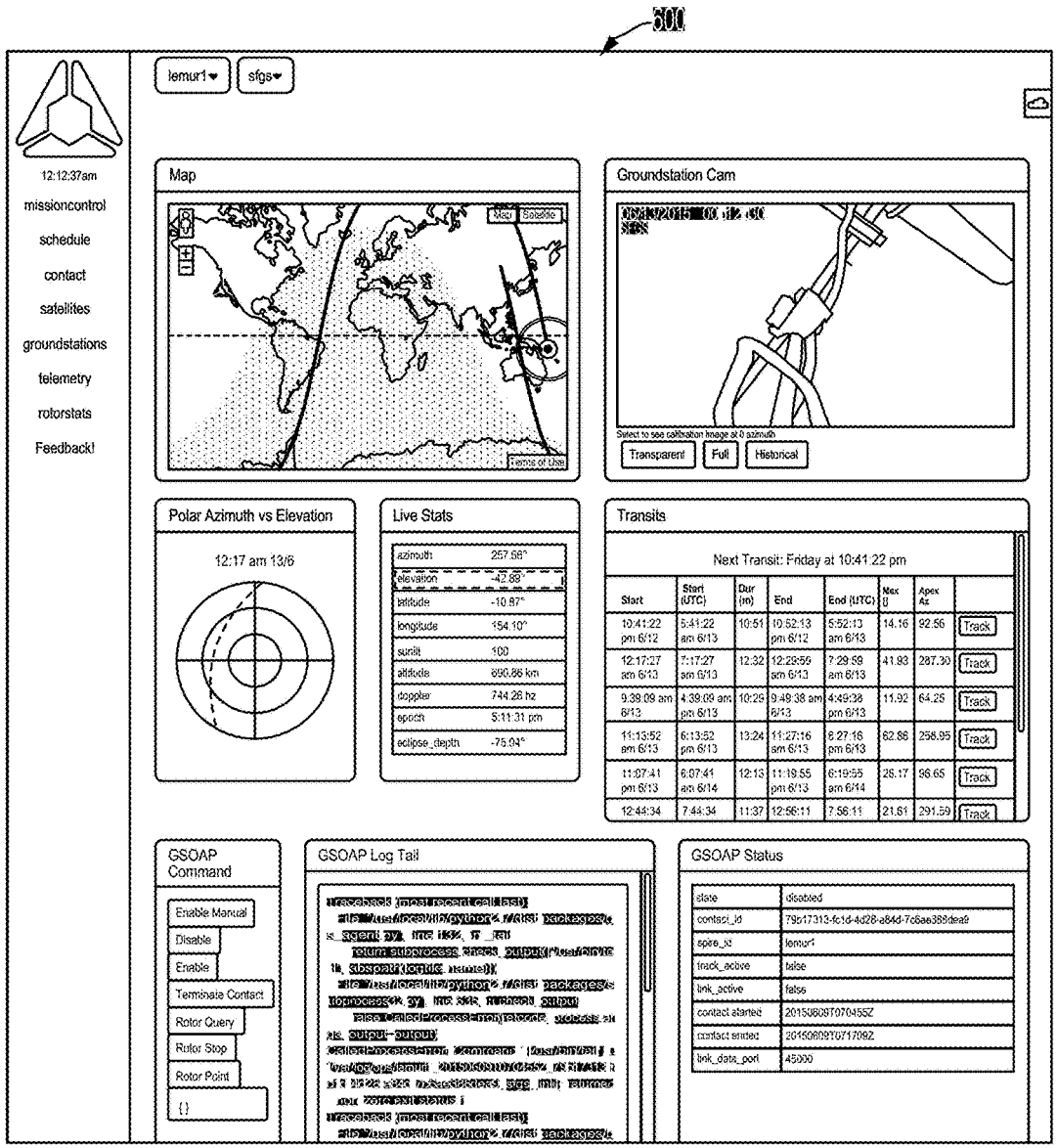
FIG. 6 illustrates an exemplary view of a dashboard according to one aspect of the present technology.

The computing device 180 may provide a dashboard to oversee ground stations and satellites. FIG. 6 illustrates an exemplary dashboard 600 that may manage a constellation of satellites and a ground station network. The dashboard 600 may provide a conglomeration of graphics and numerical data, calibration tools, tracking mechanisms, and image processing interfaces for optimizing interactions between a large network of ground stations and a large network of satellites.

To ensure obtaining accurate data of satellites from ground stations, the dashboard 600 may provide predictive and real-time tools for managing and correcting calibration of equipments at the ground stations. The dashboard 600 may provide status presentation, systematic planning, predictive mechanism, and image processing interfaces through a comprehensive portal. The dashboard 600 may allow a user to observe, locate, report, and modify real-time ground station conditions using various features. These features may be grouped into two categories: (i) rotor calibration and ground station status and review tools, and (ii) predictive and real-time planning tools.

The dashboard 600 may be configured to include any number of the featured tools as described below. Each tool may be presented individually, or in combination with other tools. Detailed discussion of these featured tools as presented individually is included herein.

1 Rotor Calibration and Ground Station Status and Review Tools

According to one aspect of the present technology, the dashboard 600 may provide rotor calibration tools. The rotor calibration tools may leverage data received from one or more ground station image sensors or cameras to provide a simple and effective means for assessing ground station antenna condition and rotor orientation.

1.1 Current Ground Station Status

Figure 7:
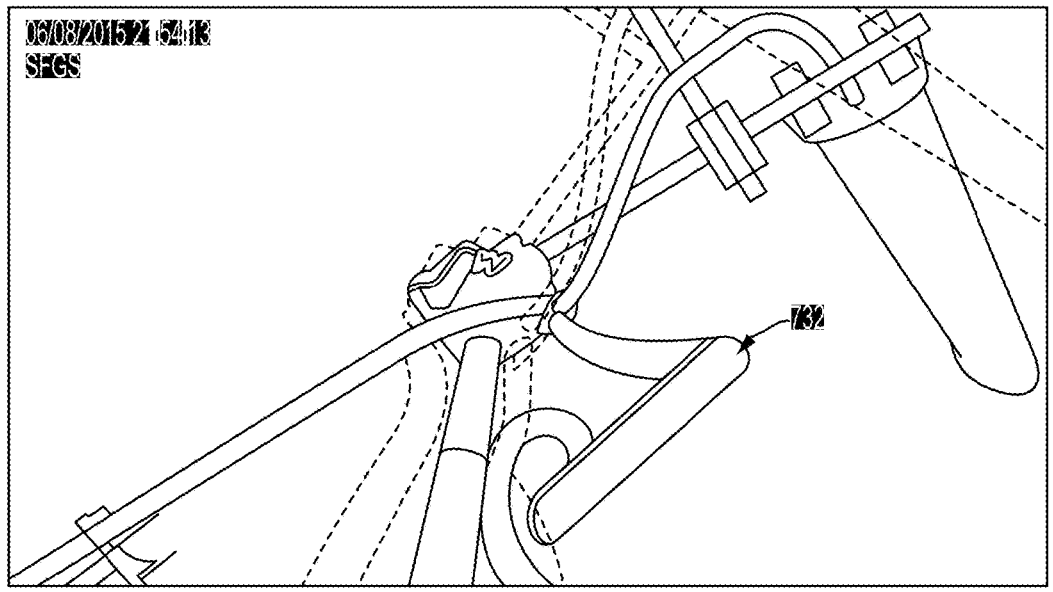
FIG. 7 illustrates a visual representation of a ground station in two different positions in an overlay manner according to one aspect of the present technology.

The dashboard 600 may provide access to live camera feeds from one or more ground stations for simple assessment of the condition and orientation of a ground station in real-time or near real-time. FIG. 7 illustrates an individual camera feed as viewed from the dashboard 600. From this view, a user may observe a general orientation of the ground station, such as an orientation of its antenna 732 and an orientation of its rotor. The user may also observe any physical condition of the ground station and make a general assessment of localized weather conditions. Physical conditions of the ground station may include, but not limited to, any of the following: physical damage, current activity or movement and nesting birds, among other possibilities. Weather conditions may include, but not limited to any of the following: cloud conditions, precipitation and wind speed, among other possibilities. Based on FIG. 7, a user may also determine whether the ground station is correctly oriented with respect to a satellite. Further, FIG. 7 may illustrate the ground station's original position or orientation. For example, as shown in FIG. 7, solid lines may illustrate the current position and orientation, whereas the dashed lines may illustrate the original position or orientation.

In some instances, the dashboard 600 may record calibration or specification information of one or more rotor components of the satellite. The recorded information may relate to a correctly calibrated position. The dashboard 600 may receive current position information of one or more rotor components as detected by sensors other than the camera. The current position may be a miscalibrated position. Based on the recorded information and the detected information, the dashboard 600 may construct an overlay image similar to that of FIG. 7 contrasting the correctly calibrated position with the miscalibrated position.

In some instances, the dashboard 600 may receive performance data of one or more rotors. The performance data may also indicate miscalibration, which in turn may trigger alerts to a user, or cause a processor to realign the rotor to its correctly calibrated position.

In one example, the processor may cross-correlate with streaming logs that provide information on link quality. Based on the streaming logs, the processor may determine accuracy of positional information of the reception device. In another example, the processor may cross-correlate with live satellite tracking information. Based on the live satellite tracking information, the processor may determine accuracy of the positional information of the reception device.

Figure 8:
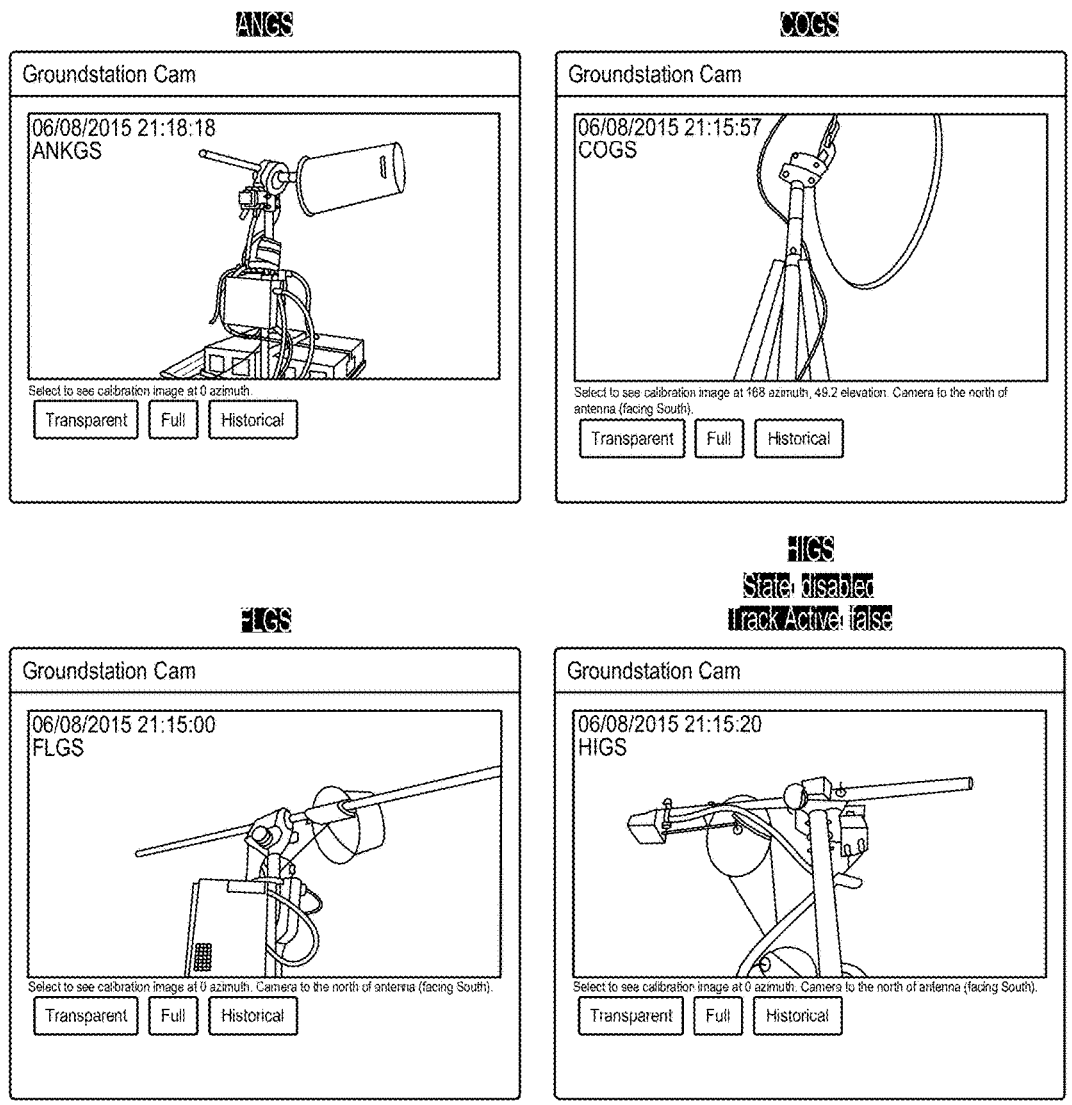
FIG. 8 illustrates a graphical display of multiple ground stations according to one aspect of the present technology.

The dashboard 600 may display the status of two or more ground stations, or in some instances, all ground stations at a glance. For example, FIG. 8 illustrates status of multiple ground stations as captured by camera feeds, providing a user with a quick method for assessing the status of a set of ground station antennas. For example, FIG. 8 illustrates the status of various ground station antennas, such as ANGS, COGS, FLGS and HIGS. Through the dashboard 600, a user may select to view each individual ground station. As illustrated in FIG. 8, a user may select to view transparent overlay, full, and historical information of each ground station by clicking on each corresponding button.

1.2 Historical View of Ground Station Antenna Rotors

According to one aspect of the present technology, a database may store historical data of each ground station's orientation and condition over a period of time. For example, the database may store camera feed data from one or more ground stations with timestamp over a period of time. Known archiving and compression techniques may be used to store significant amounts of relevant data. Alternatively, or in addition to stored video feeds, snapshots taken from video feeds may be stored at regular intervals or at significant times, such as calibration events. In some instances, instead of or in addition to the camera or video feed data, the database may store calibration or specification information of one or more rotor components of the satellite, and may also store position information of one or more rotor components as detected by sensors other than the camera with timestamp over a period of time. In another example, the database may store performance data of one or more rotors with timestamp over a period of time.

Data storage may occur at a user's computer or offsite on a database server.

Figure 9:
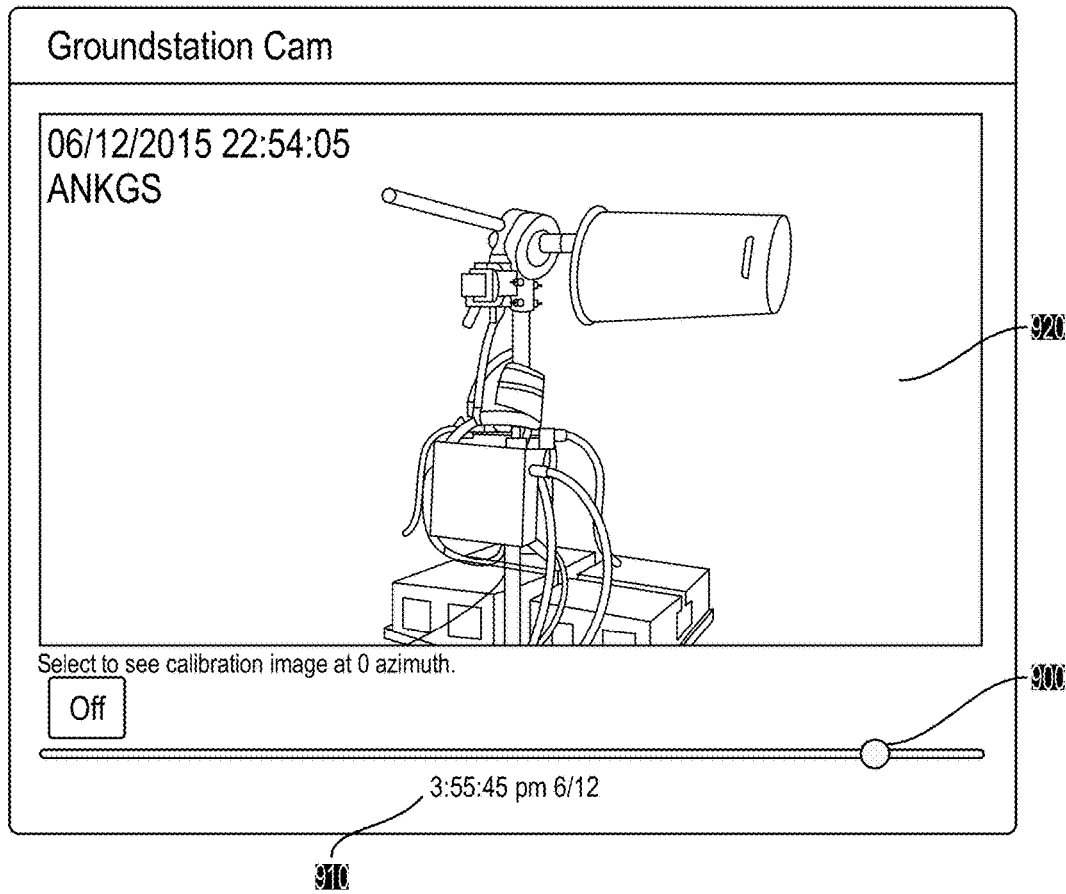
FIG. 9 illustrates a graphical display of a historical position of a ground station at a selected pointed in time according to one aspect of the present technology.

Using this stored historical data, the dashboard 600 may provide a user with a selectable interface for displaying a visual representation of a ground station from a specific time within the stored time period. The visual representation may be a snapshot or video clip of the ground station. In the alternative, the visual representation may be constructed based on the calibration, specification, position information or performance data of one or more rotor components. FIG. 9 illustrates one embodiment of such an interface. A user may manipulate a slider 900 to view the ground station at any select historical time, such as time 910. Upon user's selection, the dashboard 600 may display the associated content 920 such as video clip or still image of the ground station at the select time. The dashboard 600 may alternatively or additionally be configured to integrate other selection tools for selecting the time period to view, such as manual key entry, drop down menus, listed link, radio buttons, and the like.

Using the historical view described above, a user may assess how physical properties of a ground station antenna change over time and determine how it will likely change in the future. The physical properties may include but not limited to condition, position and orientation of the ground station.

1.3 Transparent Overlay

Figure 10:
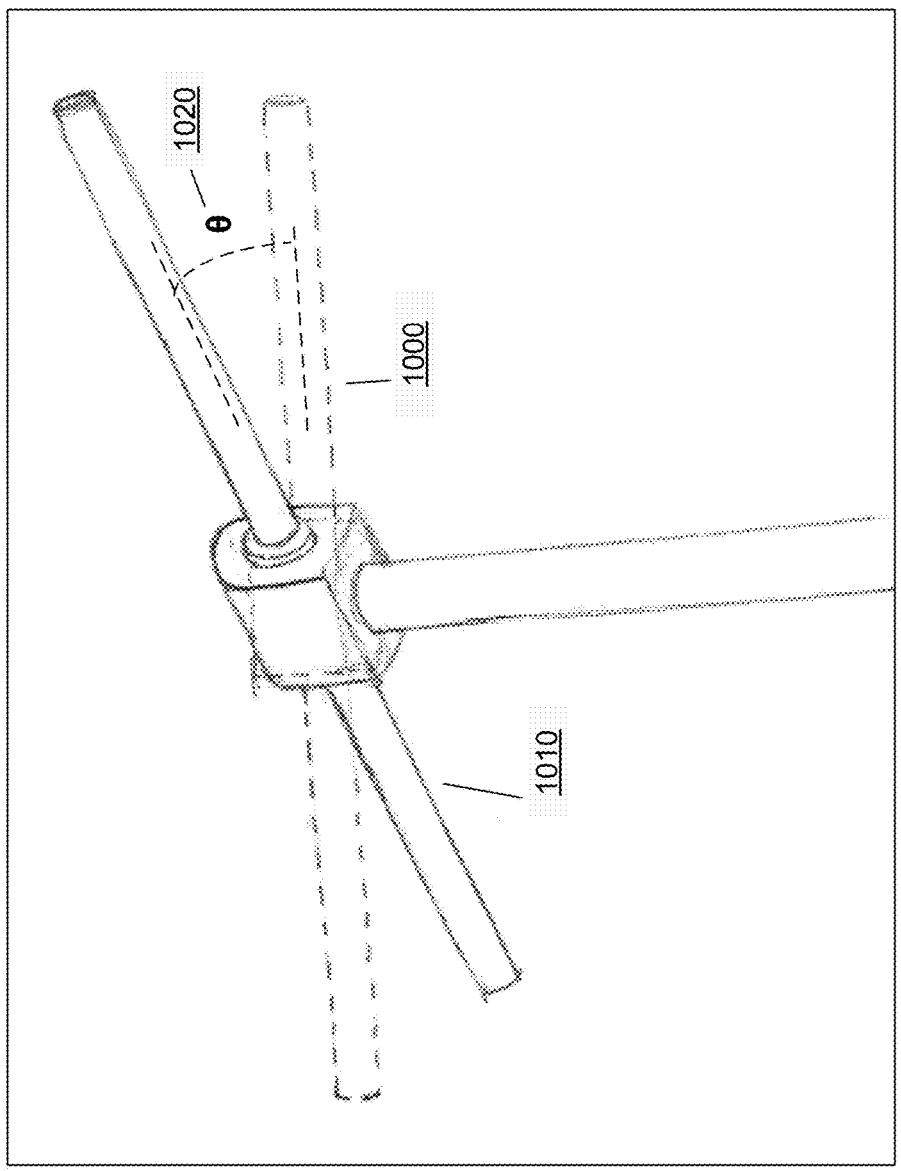
FIG. 10 is a schematic illustration of a ground station in two different positions in an overlay manner according to one aspect of the present technology.

The dashboard 600 may allow the user to view each ground station's current position relative to its original position in one view. For example, referring back to FIG. 8, if a user selects the "transparent" button with regard to each ground station display, the dashboard 600 may display a view such as FIG. 7 or FIG. 10 that overlays the ground station's original position, as shown by dashed lines, over the ground station's current position, as shown by solid lines. The ground station's original position may be a correctly calibrated position, any desired position, or any other position at a certain fixed time. The ground station's original position may not necessarily be limited to the first position that the ground station is deployed in. Its current position may be misaligned with respect to the original, correct or desired position. By way of example, in FIG. 10, the ground station's original, correct or desired position is presented as a semi-transparent overlay 1000 over the ground station's current position 1010. Such a comparison or composite view may be presented in the form of a still image or video. Differences in physical properties, such as conditions, positions and orientation, of any ground station over any period of time may be easily discernible through this tool.

A user may employ this tool to aid in the assessment and compensation of a ground station's calibration. For example, with reference to FIG. 10, a user may easily assess the degree of any displacement 1020 (represented as $\theta$ degrees) of a ground station from its original, correct or desired position. The user may make any necessary adjustment to reset the ground station to its original, correct or desired position. For example, if an angular drift of 6 degrees in azimuth is observed, the user may adjust the ground station, such as the rotor, by −6 degrees azimuth to compensate for the observed drift. In one embodiment, the user may send instructions to the ground station to make such adjustments.

In some embodiments, the user may also use any observed drift to recalibrate the ground station. The user may transmit recalibration instructions to the ground station, and the recalibration instructions may be executed by a ground station computer. If the user selects a real-time or near real-time feed as the current view of the ground station, the user may recalibrate the ground station by adjusting the orientation through control commands that compensate for the observed drift. The user may determine whether the transmitted instructions fully compensate for the drift if the current position 1010 aligns with the desired position 1000. Further adjustments may then be made until satisfactory alignment is achieved.

In one embodiment, the ground station may be reset to its desired position or orientation in both elevation and azimuth dimensions. For example, if the rotor has a desired orientation of 0 degrees elevation and azimuth, the recalibration steps described above may be conducted until the rotor is set to the same 0 degrees elevation and azimuth. The ground station may be reset to its desired position or orientation by a user's input, such as click, text input or any other mechanism provided by the dashboard 600. For example, the dashboard 600 may provide buttons to let the user control movements of the ground station. In one example, the dashboard 600 may provide an input box to receive the user's input of specific angles. Once the dashboard 600 receives a control command for a ground station, a camera positioned at the ground station may capture the ground station as the ground station moves, and such movements may be displayed in the dashboard 600 in real time or near real-time. For example, the dashboard 600 may show an actual antenna array moving into desired coordinates in near real-time.

1.3.1 Image Processing and Enhancement

The dashboard 600 may include image processing and enhancement tools to aid the analysis of antenna orientation and calibration drift. The dashboard 600 may include simple digital enhancement filters, such as contract and sharpness enhancement, to render antenna structures in the camera images with increased clarity for easier visual analysis.

The dashboard 600 may also include advanced edge detection algorithms to leverage the image processing capabilities of a computer to further delineate and isolate antenna structures for visual analysis. Common edge detection algorithms may include Sobel, Canny, Prewitt, Roberts, and fuzzy logic methods. Used within the Transparent Overlay tool, images rendered using an edge detection process may be colorized to further distinguish between a ground station's current position and its desired position.

More advanced computer vision techniques can shift the bulk of the analysis from the user to a computer. Pose estimation techniques, such as nonlinear CPC, Posit, and DLT, may be implemented as part of the image processing and enhancement tool to calculate a ground station's orientation from one or more camera images. Pose calculations may be performed based on a first image recording the ground station's desired position and a second image recording the ground station's current position. In one example, the calibration drift may be derived as the angular displacement of the mast and antenna boom in the current view with respect to the calibration view.

In another embodiment, to aid in visual or computerized orientation analysis, markings may be affixed to or painted on the ground station antenna mast and booms. The markings may provide visible reference points on the antenna structure to facilitate assessment of orientation.

1.4 Real-Time Elevation and Azimuth Graphic

Figure 11:
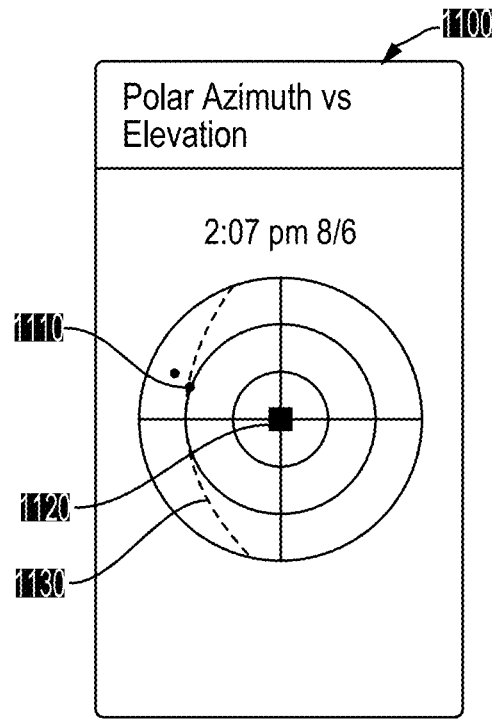
FIG. 11 illustrates a polar coordinates graph showing a satellite's position and its predicted path relative to a field of view of a ground station according to one aspect of the present technology.

The dashboard 600 may include a polar coordinates graph 1100 as illustrated in FIG. 11. Such a tool may provide a graphic representation of the location of one or more satellites 1110 with respect to a select ground station 1120. The predicted path 1130 of one or more satellites 1110 may be presented in the graph 1100. The antenna orientation of the select ground station may also be presented through the same graph. For example, this information may be presented at real-time or near real-time. A user may use this information to aid in the tracking of one or more satellites as the satellite traces across the sky, or to simply assess whether a particular ground station is suitable for use.

In one embodiment, the azimuth may be represented as the angular coordinate and the elevation may be represented as the radial coordinate. The pole of the grid may represent the ground station location and the polar axis may be aligned with the reference orientation of the ground station (e.g., 0 degrees azimuth and elevation calibrated direction). Plotted points may be calculated within this frame of reference. In addition to polar coordinates, other coordinate systems may also be utilized to represent the information for analysis by a user.

The satellite locations 1110 may be plotted as dots, squares or icons. They can be displayed in different colors or as different icons to help a user distinguish multiple satellites that may appear on the same grid. The satellites may also be labeled with further information, such as satellite name, capabilities, geolocation coordinates, and status. The satellites may be selected to show their predicted paths represented by a graphical line plot 1130. The ground station orientation may be represented to convey the current azimuth and elevation settings of the ground station. This may be shown as a dot or icon in the polar grid. In some embodiments, it may be plotted in a manner that distinguishes the orientation plot from the satellite location plots. Alternatively, orientation may be shown as a ray originating from the pole and terminating with a radial coordinate equal to the elevation value and an angular coordinate equal to the azimuth setting. Other useful graphical representations may work off this representation, such as an arrow or dotted line.

According to one aspect of the disclosed technology, the position of each satellite may be derived based on a list of orbital parameters, including, for example, inclination, eccentricity and perigee, among other possibilities. The list of orbital parameters may be predetermined and stored in a non-transitory computer-readable storage medium of a local or remote computing device. In one example, the list of orbital parameters may be stored on a server hosting a website accessible by the dashboard 600. The orbital parameters may be determined based on GPS data. The orbital parameters may be updated from time to time to accurately estimate satellite paths.

The disclosed technology may implement any algorithms to calculate elevation and azimuth, including but not limited to any one of the following: SGP4, SGP, SGP4, SDP4, SGP8 and SDP8. In some instances, the elevation and azimuth calculation algorithm may be based on a command tool called predict. In one embodiment, the ground station may perform the elevation and azimuth calculation, for example, when the algorithm is ported to Python. In another embodiment, the dashboard 600 may perform the elevation and azimuth calculation, for example, when the algorithm is ported to javascript.

2 Predictive and Real-Time Planning Tools and Mechanisms

A small satellite may communicate with many ground stations as it travels through its orbit. However, due to its low earth orbit, the satellite may present each ground station with only a relatively narrow window period of viable transmission. A ground station's location with respect to a satellite's orbit path may have a direct effect on its transmission window. Selecting an optimal ground station location may thus become a crucial step in maximizing the limited window of viable transmission. Other important factors for selecting a ground station include station status and capability, and local weather conditions.

This information is presented to a user through the dashboard 600 interface through one or more enabled features, which are described below.

2.1 Interface to Locate Ground Stations and Satellites

Figure 12:
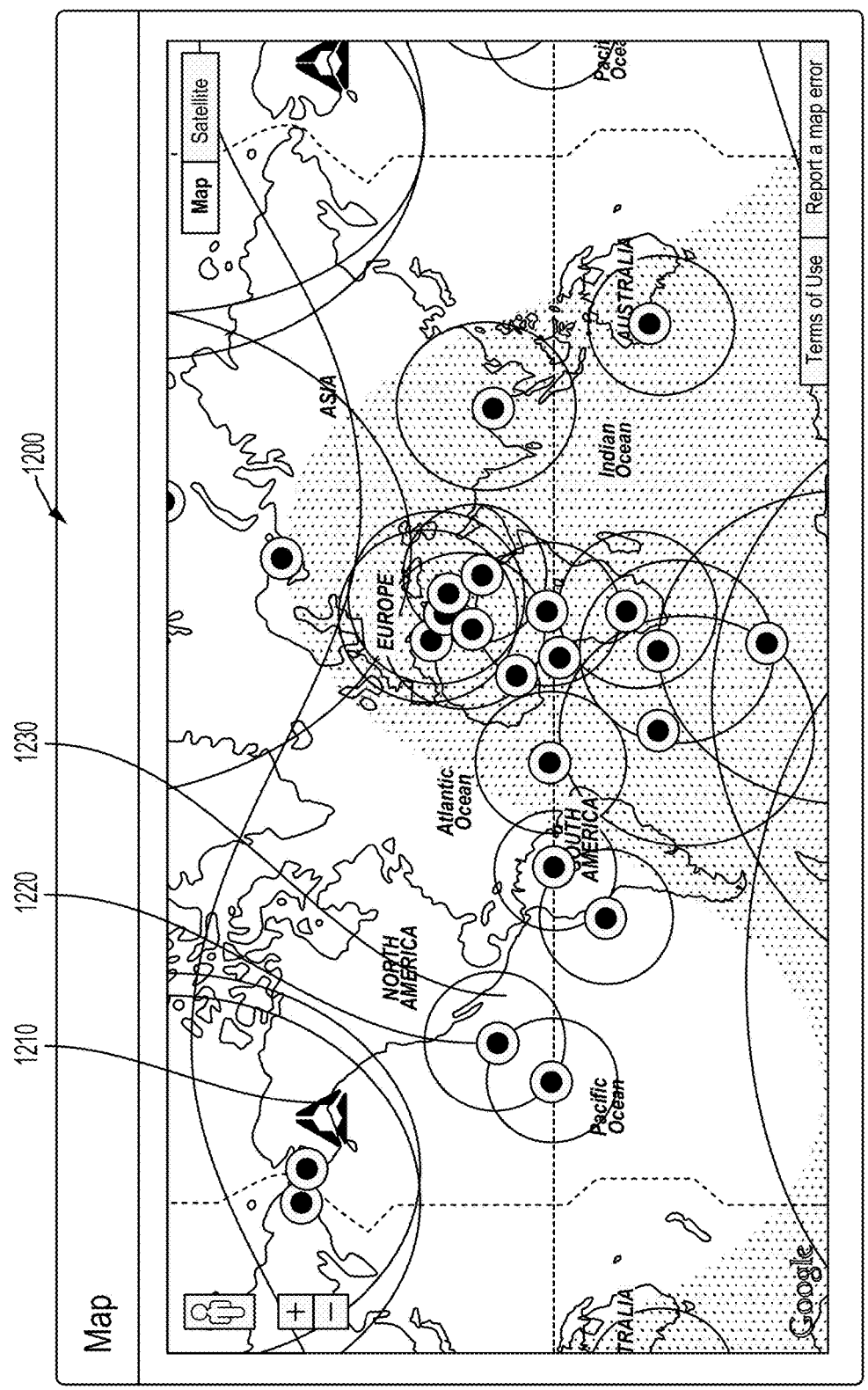
FIG. 12 illustrates a distribution of ground stations and satellites in a geographical map according to one aspect of the present technology.

FIG. 12 illustrates an exemplary interface 1200 to locate ground stations and satellites. This dashboard interface may present a geographical map indicating the location of one or more ground stations 1210 and satellites 1220 at or near real-time. These points may be plotted on the map as dots, icons or other graphical representations. Ground stations may appear differently from the satellites to aid in the assessment of the presented information.

The area from which a satellite is visible—and thus likely capable of transmission—may be derived from the satellite's geolocation and elevation. In the interface 1200, this area may be represented in a graphical form, such as a colorized or shaded area 1230, and/or as an outlined shape. Ground stations 1210 that fall within the derived visible scope may appear within the indicated area. The interface 1200 may provide a user with a simple means for determining which ground stations are or will likely be within the transmission range of a particular satellite. As shown in FIG. 12, visible areas 1230 for multiple satellites may be shown simultaneously, allowing the user to determine which satellites are visible from a particular ground station.

The ground stations and satellites may be associated with other data, such as name, status, capabilities, or other information relevant to a user's assessment and selection. Some or all of this information may also be displayed as part of the plot points. In an illustrative embodiment, when a user rolls over a mouse pointer on a particular ground station or satellite on the interface, a "pop-up" type window containing this information for the ground station or satellite may appear. This information may also appear through other means of conveyance, such as a side panel in the interface upon roll over, or as a separate window.

The interface may allow a user to apply different filters to display only those ground stations and satellites that meet user-specified criteria. This allows a user to limit the amount of presented information and isolate the information that is relevant. For example, a user may be interested only in communicating with satellites operating over K-band frequencies. A filter may be applied to display only ground stations that are equipped with antennas capable of operating on these frequencies. Different filters may be combined to further limit the visible information.

2.2 Interface to Plan and Predict the Path of Satellites

Figure 13:
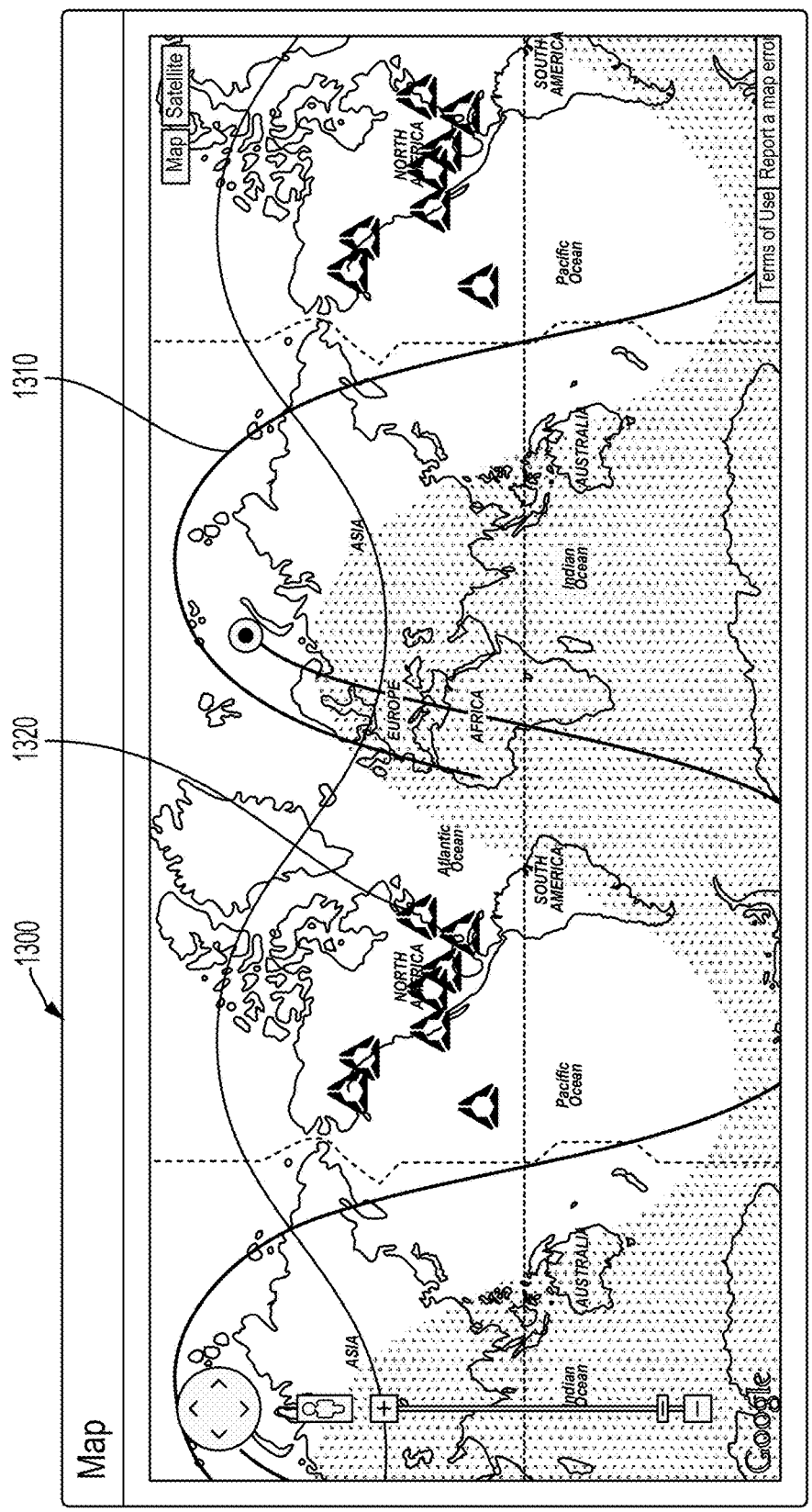
FIG. 13 illustrates a distribution of ground stations, a satellite, and the satellite's predicted path in a geographical map according to one aspect of the present technology.

FIG. 13 illustrates an exemplary interface 1300 to plan and predict the path of satellites. This interface 1300 may augment the interface 1200 described above with predicted satellite paths 1310 to allow a user to make the same assessment and selection for future satellite-ground station interactions. As illustrated in FIG. 13, the predicted satellite path may appear as a traced line 1310. The user may make certain ground stations 1320 visible as described above to determine which ground stations will fall near the predicted path of a satellite 1310.

The interface 1300 may also present the time period when a satellite is expected to pass through a particular point in the highlighted path. For example, if a user rolls over point along the traced path, a pop-up window may indicate the date and time that the satellite will appear at that point.

The path may be further augmented with the visible area derivation described above. As applied here, the visible area of a satellite when it appears at a specific point along the predicted path may be estimated using the geolocation of the point and predicted elevation of the satellite when it reaches that point. This area may be represented as described above when a user selects or rolls over a point on the predicted path. In another embodiment, the area may be derived and interpolated for the entire predicted path. It may then be represented as a shaded area surrounding the path, or as a set of lines representing the outer boundary of the area.

2.3 Ground Station Status Monitor System

FIG. 14 illustrates an exemplary display 1400 of ground station monitor status. This display 1400 may allow users to view and monitor the status of a set of multiple ground stations at-a-glance. The display 1400 may give a remote user insight into the resources utilized and available at select ground stations. The display 1400 may present the overall health and utilization of a ground station network. The user may make more informed choices as to which ground station to task with communicating with a satellite.

Various status variables may be selected for presentation through this display 1400, such as ground station ID, Host Name, CPU, Memory, Status, Status ID, and Heartbeat. Other accessible data feeds from ground stations may also be presented. In one example, when a user clicks on a status variable in the display 1400, a menu may display providing more information of the corresponding ground station. In another example, such a click may bring up any one of the visual representations of the corresponding ground station as illustrated in FIGS. 7-11, including a window displaying visual camera feeds of the corresponding ground station.

2.4 Weather Variable Prediction

The dashboard 600 may also display weather predication or forecast as illustrated in FIG. 15. Small satellite transmissions may operate on relatively weak signal strength. As such, such satellites may be sensitive to weather conditions, such as cloud cover. A user selecting a ground station to communicate with a satellite may thus be concerned with the local weather conditions at or near the ground stations, and along the propagation path between the ground stations and satellite. The weather prediction display 1500 may provide weather forecast information for a select ground station location.

In one embodiment, predictions for weather conditions that could affect satellite transmissions may be presented, such as temperature, precipitation, wind speed, fog, smog and other air pollution, thunder, lightning, humidity, and solar radiation.

2.5 Maximize Outcome

The dashboard 600 may control at least one ground station or at least one satellite to maximize a certain outcome. To complete a particular task, the dashboard 600 may automatically select one or more satellites based on criteria of the task. For example, to maximize downlinks for user desired data during a period of time, the dashboard 600 may select one or more satellites that are in orbits and have payloads that provide the user desired data, and instruct the selected satellites to perform accordingly. In another example, to maximize uplinks, the dashboard 600 may instruct newly launched satellite during its deployment phase.

In some embodiments, the dashboard 600 may provide an interface to allow a user to perform the above control. By way of example, the dashboard 600 may display information as to which satellites are in orbits, and payload information on each satellite. The user may select one or more satellites to maximize downlinks, uplinks, or the combination thereof accordingly.

2.6 Schedule and Priority

According to one aspect of the disclosed technology, the dashboard 600 may schedule satellite missions. For example, the dashboard 600 may schedule which missions should run on which satellite. The dashboard 600 may schedule a mission for a satellite when the satellite enters the field of view of a ground station, such as when the satellite is at a position where the ground station may receive radio waves from the satellite. The dashboard 600 may also remove the satellite from that mission when the satellite leaves the field of view of the ground station, such as when the satellite is at a position where the ground station may not receive radio waves from the satellite. The dashboard 600 may prioritize satellite missions. The dashboard 600 may tune satellite missions based on their importance and urgency.

3 Exemplary Operations

The computing device 180 may include one or more processors and a non-transitory computer-readable storage medium. The computing device 180 may perform various operations as described herein.

Figure 16:
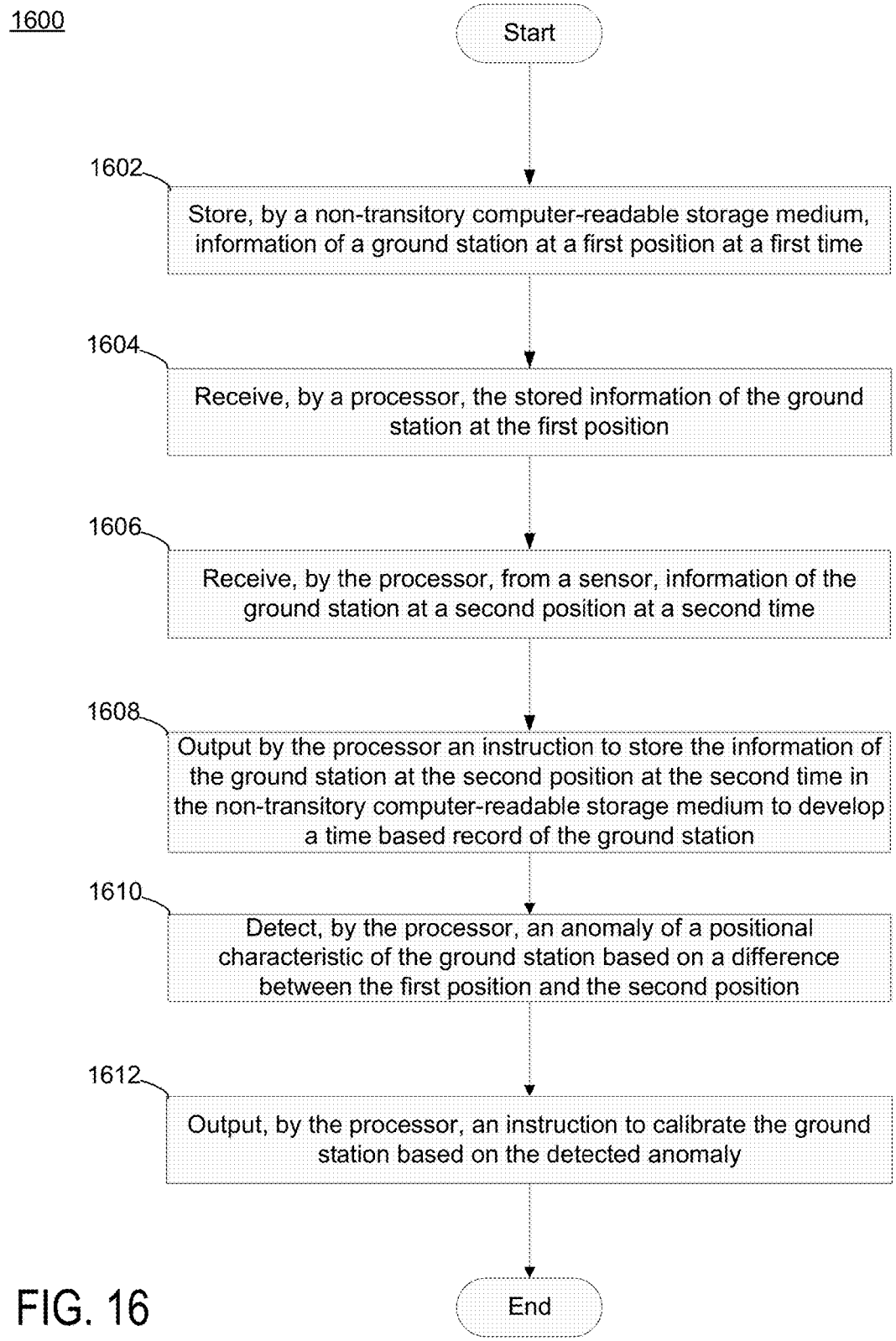
FIG. 16 is a flow chart illustrating example steps that may be executed by a computing device to manage a ground station.

FIG. 16 is a flow chart 1600 illustrating example steps that may be executed by the computing device 180 to manage a ground station. At 1602, a non-transitory computer-readable storage medium may store information of the ground station at a first position at a first time. At 1604, a processor may receive the stored information of the ground station at the first position. At 1606, the processor may receive from a sensor information of the ground station at a second position at a second time. The sensor may be the image sensor 136. At 1608, the processor may output an instruction to store the information of the ground station at the second position at the second time in the non-transitory computer-readable storage medium to develop a time based record of the ground station. At 1610, the processor may detect an anomaly of a positional characteristic of the ground station based on a difference between the first position and the second position. For example, with reference to FIGS. 7 and 10, the processor may determine a difference between the original position of the ground station represented by dashed line and its current position represented by solid lines. The original position may be a correctly calibrated position. The difference may raise a need to calibrate the ground station's rotor. At 1612, the processor may output an instruction to calibrate the ground station based on the detected anomaly.

In one embodiment, the processor may output for display a graphical illustration of the ground station at the first position and at the second position in an overlay manner. In one embodiment, the ground station may define a field of view within which the ground station receives radio waves from a satellite. The ground station includes a rotor to adjust the field of view. In one embodiment, the processor may output the instruction to calibrate the rotor based on the detected anomaly.

Figure 17:
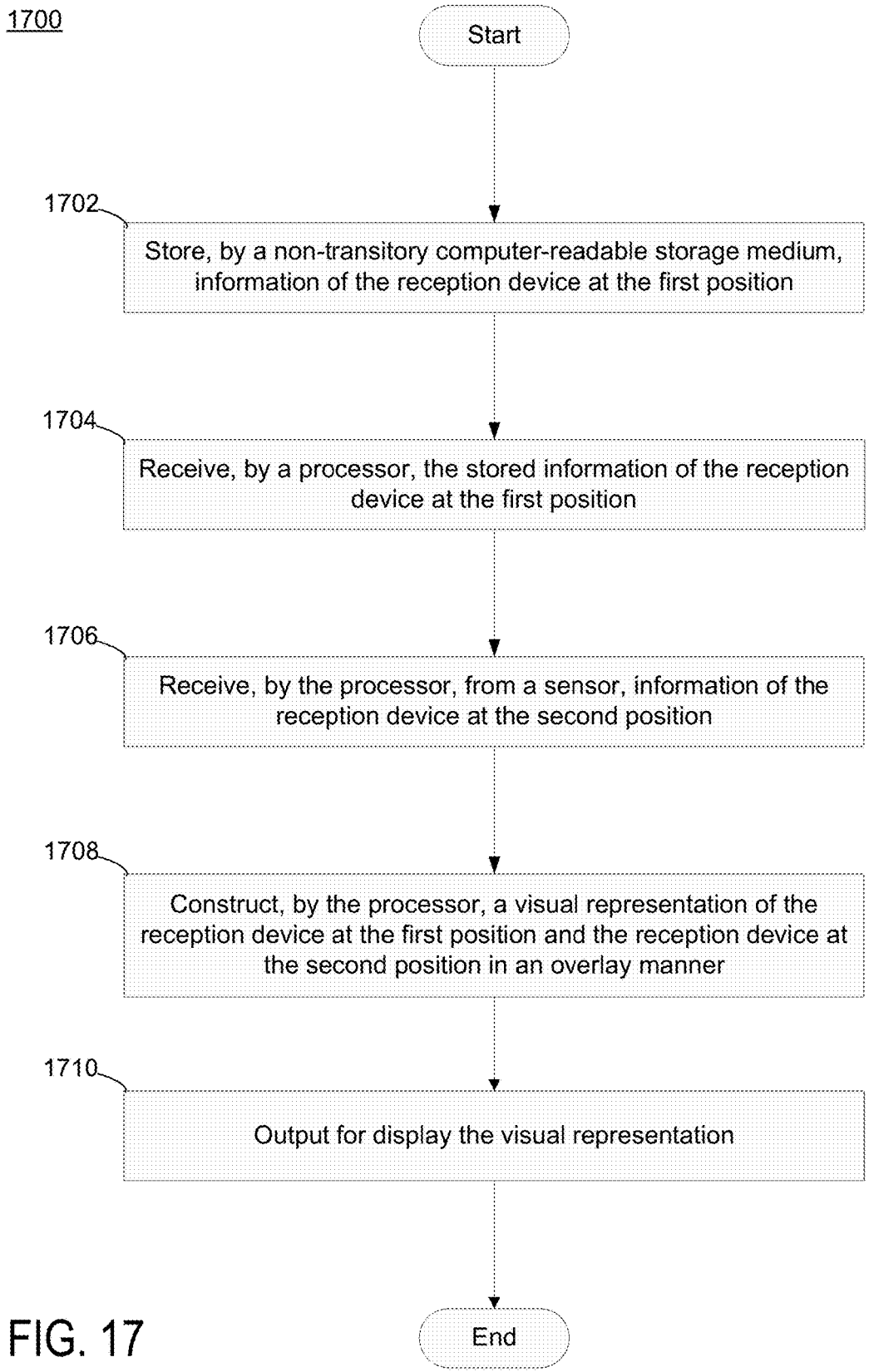
FIG. 17 is a flow chart illustrating example steps that may be executed by a computing device to provide a graphical display of information related to a satellite reception device.

FIG. 17 is a flow chart 1700 illustrating example steps that may be executed by the computing device 180 to provide a graphical display of information related to a satellite reception device. The satellite reception device changes from a first position at a first time to a second position at a second time. At 1702, a non-transitory computer-readable storage medium may store information of the satellite reception device at the first position. At 1704, a processor may receive the stored information of the satellite reception device at the first position. At 1706, the processor may receive from a sensor information of the satellite reception device at the second position. The sensor may be the image sensor 136. At 1708, the processor may construct a visual representation of the satellite reception device at the first position and at the second position in an overlay manner. At 1710, the processor may output for display the visual representation. Examples of such displays may be found in FIGS. 7 and 10.

In one embodiment, the stored information of the satellite reception device at the first position may include visual information. The visual information may include at least one of image and video formats. In one embodiment, the sensor may include a camera. In one embodiment, the visual representation may distinguish the reception device at the first position from the reception device at the second position. In one embodiment, the processor may determine a degree of miscalibration based on a difference between the first position and the second position. The first position may be a correctly calibrated position, and the second position may be an incorrectly calibrated position. In one embodiment, the processor may output an instruction to calibrate the reception device based on the determined degree of miscalibration. In one embodiment, the processor may output for display a notification to a user to calibrate the reception device. In one embodiment, the correctly calibrated position may be associated with predetermined elevation and azimuth values. In one embodiment, the reception device may be a ground station. In one embodiment, the reception device may define a field of view within which the reception device receives radio waves from a satellite. The reception device may include a rotor to adjust the field of view. In one embodiment, the processor may output an instruction to calibrate the rotor based on a difference between the first position and the second position.

Figure 18:
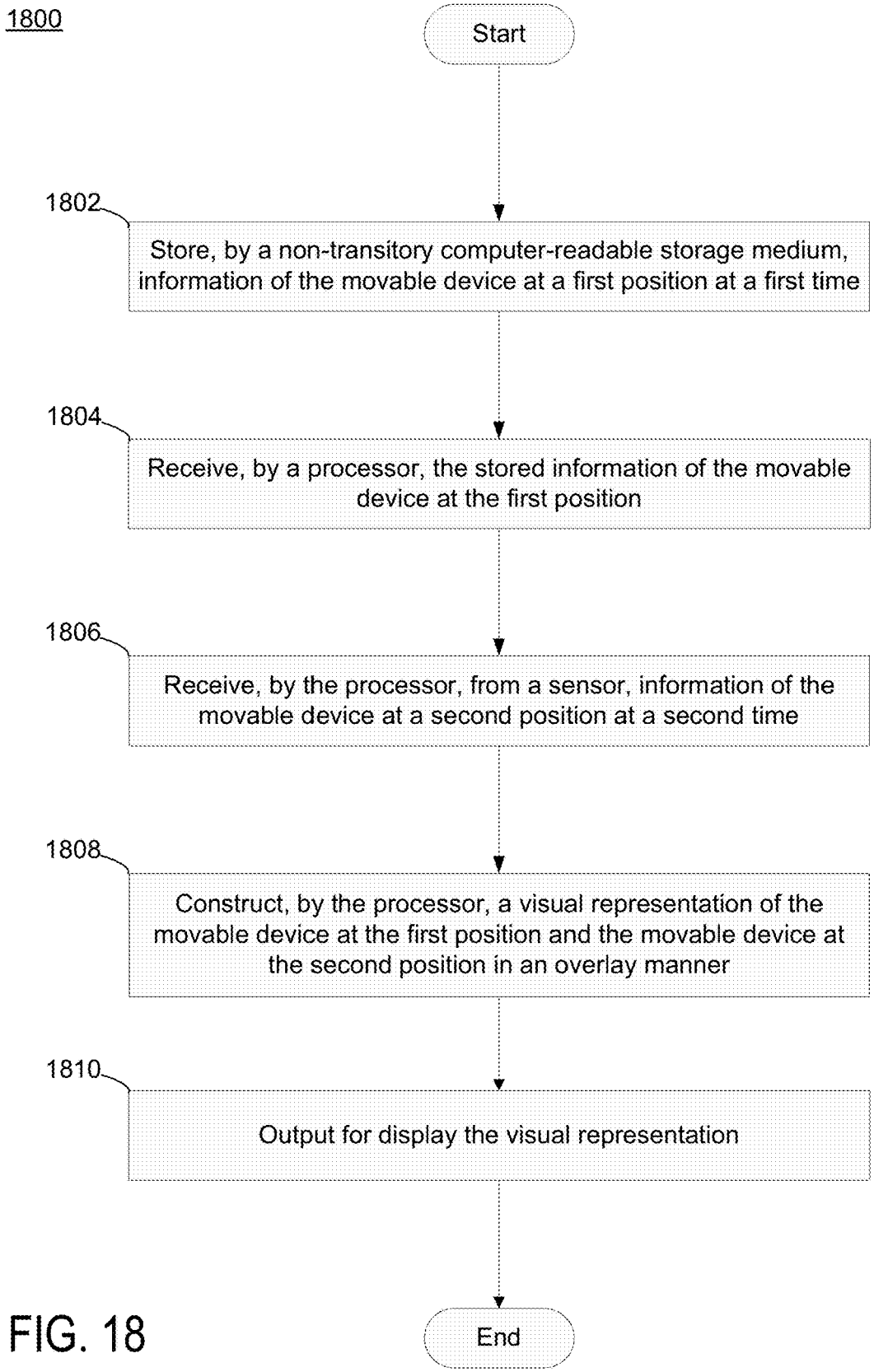
FIG. 18 is a flowchart illustrating example steps that may be executed by a computing device to provide a graphical display of information related to a movable device at a ground station.

FIG. 18 is a flowchart 1800 illustrating example steps that may be executed by the computing device 180 to provide a graphical display of information related to a movable device at a ground station. The movable device may effect a positional change in the ground station to track a satellite. At 1802, a non-transitory computer-readable storage medium may store information of the movable device at a first position at a first time. At 1804, a processor may receive the stored information of the movable device at the first position. At 1806, the processor may receive from a sensor information of the movable device at a second position at a second time. The sensor may be the image sensor 136. At 1808, the processor may construct a visual representation of the movable device at the first position and the movable device at the second position in an overlay manner. At 1810, the processor may output for display the visual representation. Examples of such displays may be found in FIGS. 7 and 10.

In one embodiment, the first position and the second position of the movable device each may include an elevation dimension and an azimuth dimension. In one embodiment, the movable device may be a rotor that adjusts the ground station to track the satellite. In one embodiment, the stored information of the movable device at the first position may include visual information. In one embodiment, the visual information may include at least one of image and video formats. In one embodiment, the sensor may include a camera. In one embodiment, the visual representation may distinguish the movable device at the first position from the movable device at the second position. In one embodiment, the processor may determine a degree of miscalibration based on a difference between the first position and the second position. The first position may be a correctly calibrated position, and the second position may be an incorrectly calibrated position. In one embodiment, the processor may output an instruction to calibrate the movable device based on the determined degree of miscalibration. In one embodiment, the processor may output for display a notification to a user to calibrate the movable device. In one embodiment, the correctly calibrated position may be associated with predetermined elevation and azimuth values. In one embodiment, the ground station may define a field of view within which the ground station receives radio waves from a satellite. The movable device may adjust the field of view.

Figure 19:
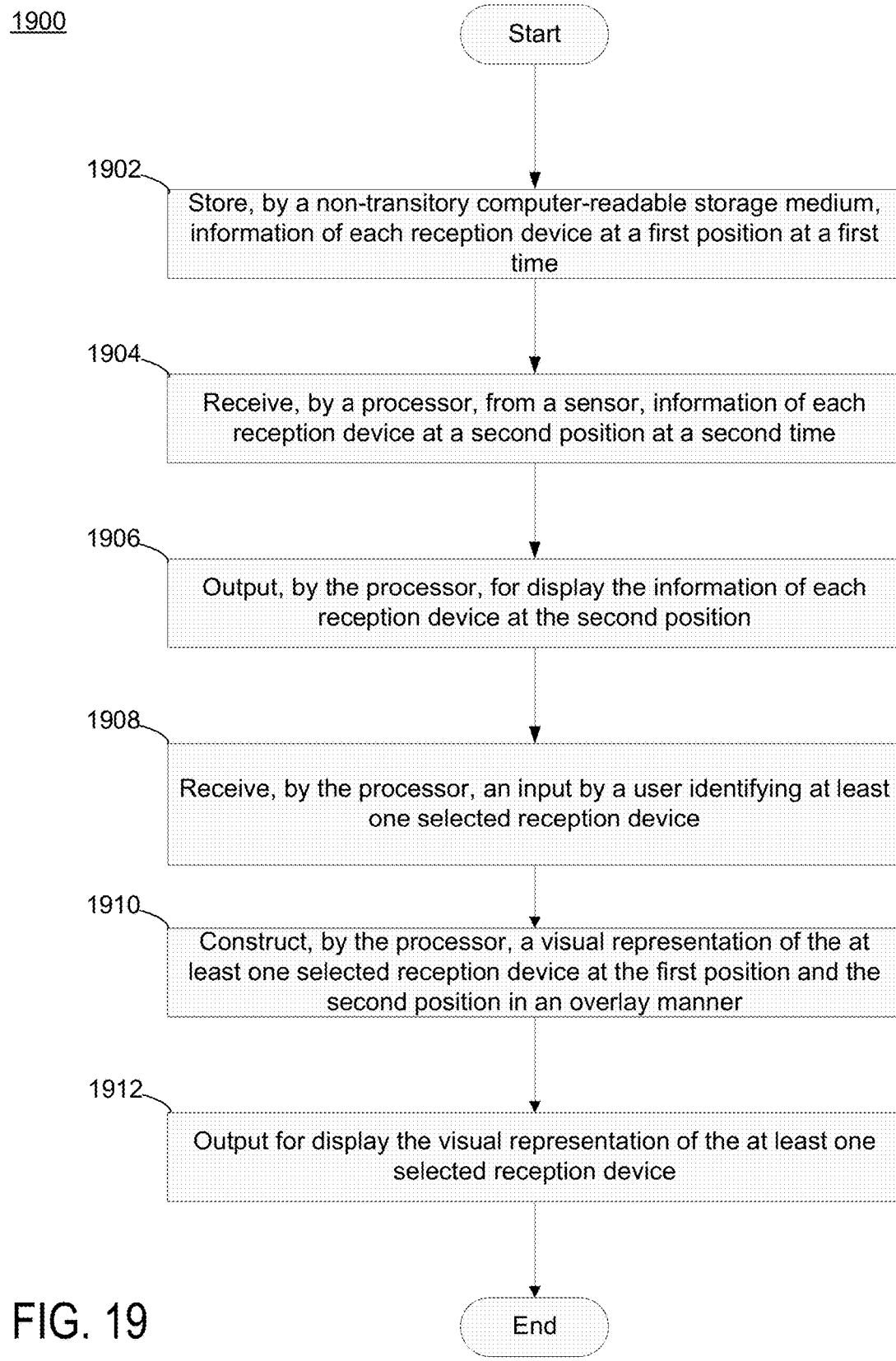
FIG. 19 is a flowchart illustrating example steps that may be executed by a computing device to provide a graphical display of information related to a plurality of satellite reception devices.

FIG. 19 is a flowchart 1900 illustrating example steps that may be executed by the computing device 180 to provide a graphical display of information related to a plurality of satellite reception devices. At 1902, a non-transitory computer-readable storage medium may store information of each reception device at a first position at a first time. At 1904, a processor may receive, from a sensor information of each reception device at a second position at a second time.

The sensor may be an image sensor. At 1906, the processor may output for display the information of each reception device at the second position. Examples for such a display may be found in FIG. 8, which illustrates a display of various ground stations. At 1908, the processor may receive an input by a user identifying at least one selected reception device. For example, the user may press any button shown in FIG. 8 to select a ground station for further information. At 1910, the processor may construct a visual representation of the at least one selected reception device at the first position and the second position in an overlay manner. At 1912, the processor may output for display the visual representation of the at least one selected reception device. Examples of such displays may be found in FIGS. 7 and 10.

In one embodiment, each of the first position and the second position of each reception device may include an elevation dimension and an azimuth dimension. In one embodiment, the reception devices may be ground stations. In one embodiment, the stored information of each reception device may include visual information. The visual information may include at least one of image and video formats. In one embodiment, the sensor may include a camera. In one embodiment, the visual representation may distinguish the at least one selected reception device at the first position from the second position. The first position may be a correctly calibrated position. The processor may determine a degree of miscalibration based on a difference between the first position and the second position. In one embodiment, the processor may output an instruction to calibrate the at least one selected reception device based on the determined degree of miscalibration. In one embodiment, the processor may output for display an instruction to a user to calibrate the at least one selected reception device. In one embodiment, the correctly calibrated position may be associated with predetermined elevation and azimuth values. In one embodiment, each reception device may define a field of view within which the reception device receives radio waves from a satellite. Each reception device may include a rotor to adjust the field of view. In one embodiment, the processor may output an instruction to calibrate the rotor based on a difference between the first position and the second position.

FIG. 20 is a flowchart 2000 illustrating example steps that may be executed by the computing device 180 to provide a graphical display to manage a satellite reception device that tracks a satellite. The reception device may define a field of view within which the reception device receives radio waves from the satellite. At 2002, a processor may receive a satellite's position. At 2004, the processor may receive from a sensor information of the reception device including positional information of the reception device. The sensor may be an image sensor. At 2006, the processor may determine a field of view of the reception device based on the received information. At 2008, the processor may determine a predicted path of the satellite relative to the field of view of the reception device. At 2010, the processor may output for display a polar coordinates graph illustrating the satellite's position and the predicted path of the satellite relative to the field of view of the reception device. An example of such a display may be found in FIG. 11.

In one embodiment, the positional information of the reception device may include an elevation dimension and an azimuth dimension. In one embodiment, the reception device may include a rotor to adjust the field of view. In one embodiment, the processor may determine elevation and azimuth information of the reception device based on the visual information of the reception device. In one embodiment, the processor may output an instruction to calibrate the reception device. In one embodiment, the processor may receive the satellite's position and the visual information of the reception device at real time or quasi real time. In one embodiment, the processor may output for display an updated polar coordinates graph that illustrates an updated satellite's position and an updated predicted path of the satellite relative to an updated field of view of the reception device.

Figure 21:
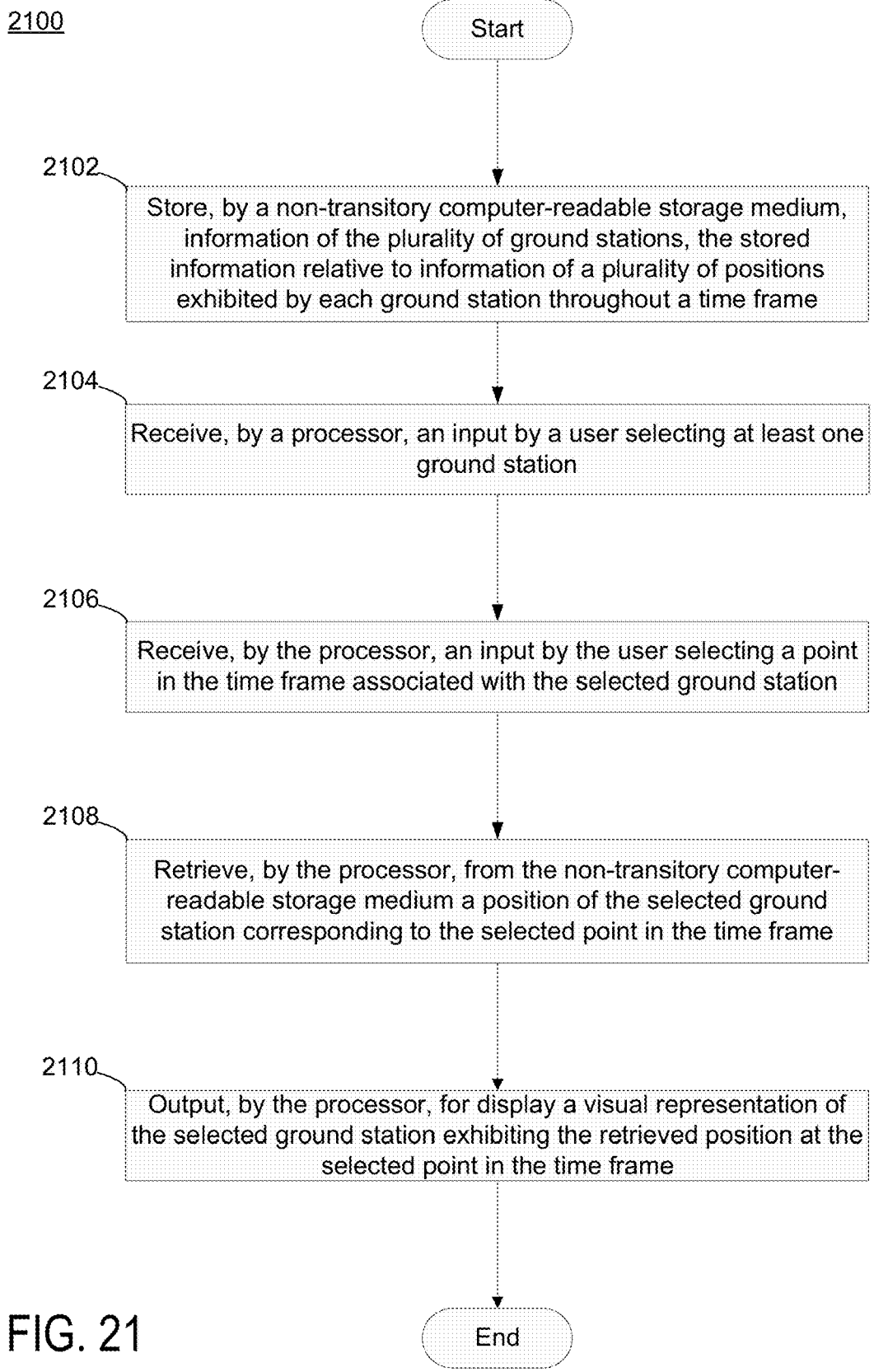
FIG. 21 is a flowchart illustrating example steps that may be executed by a computing device to provide a graphical display of information related to a plurality of ground stations.

FIG. 21 is a flowchart 2100 illustrating example steps that may be executed by the computing device 180 to provide a graphical display of information related to a plurality of ground stations. At 2102, a non-transitory computer-readable storage medium may store information of the plurality of ground stations. The stored information may relate to information of a plurality of positions exhibited by each ground station throughout a time frame. At 2104, the processor may receive an input by a user selecting at least one ground station. At 2106, the processor may receive an input by the user selecting a point in the time frame associated with the selected ground station. At 2108, the processor may retrieve from the non-transitory computer-readable storage medium a position of the selected ground station corresponding to the selected point in the time frame. At 2110, the processor may output for display a visual representation of the selected ground station exhibiting the retrieved position at the selected point in the time frame. An example of such a display may be found in FIG. 9.

In one embodiment, each position of each ground station may include an elevation dimension and an azimuth dimension. In one embodiment, the stored information in the non-transitory computer-readable storage medium may include information of each ground station at a correctly calibrated position. In one embodiment, the processor may construct a visual representation of the selected ground station at the selected point in the time frame and at the correctly calibrated position in an overlay manner. In one embodiment, the processor may output for display the constructed visual representation. In one embodiment, the processor may retrieve from the non-transitory computer-readable store medium positions of the selected satellite subsequent to the selected point in the time frame. The processor may output for display, in a time sequence, a visual representation of the selected satellite exhibiting the retrieved positions sequent to the selected point in the time frame. In one embodiment, each ground station may define a field of view within which the ground station receives radio waves from a satellite. The ground may include a rotor to adjust the field of view. In one embodiment, the positions of each ground station may include positions of the rotor associated with the ground station.

Figure 22:
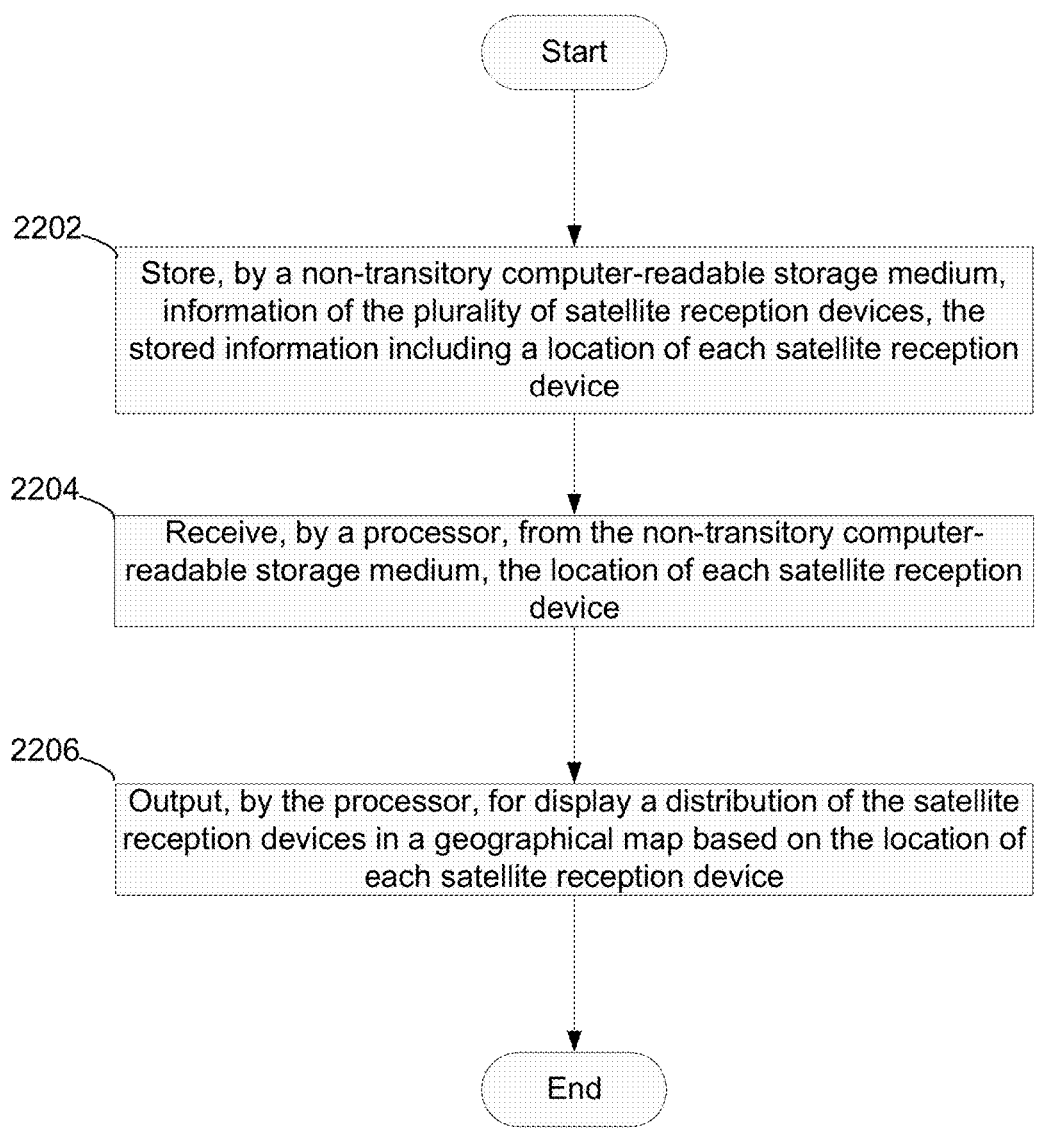
FIG. 22 is a flowchart illustrating example steps that may be executed by a computing device to provide a graphical display of information related to a plurality of satellite reception devices.

FIG. 22 is a flowchart 2200 illustrating example steps that may be executed by the computing device 180 to provide a graphical display of information related to a plurality of satellite reception devices. At 2202, a non-transitory computer-readable storage medium may store information of the plurality of satellite reception devices. The stored information may include a location of each satellite reception device. At 2204, a processor may receive, from the non-transitory computer-readable storage medium, the location of each satellite reception device. At 2206, the processor may output for display a distribution of the satellite reception devices in a geographical map based on the location of each satellite reception device. An example of such a display may be found in FIG. 12.

In one embodiment, at least one satellite reception device may be a ground station. In one embodiment, each satellite reception device may define a field of view within which the satellite reception device receives radio waves from a satellite. In one embodiment, the processor may output for display at least one satellite in the geographical map within a field of view of at least one of the satellite reception devices. In one embodiment, the processor may receive information about at least one satellite. The received information may include a location of the at least one satellite. In one embodiment, the processor may output for display the at least one satellite in the geographical map based on the location of the at least one satellite. In one embodiment, the processor may predict a path of the at least one satellite. In one embodiment, the processor may output for display the predicted path of the at least one satellite in the geographical map. An example for such a display may be found in FIG. 13.

Figure 23:
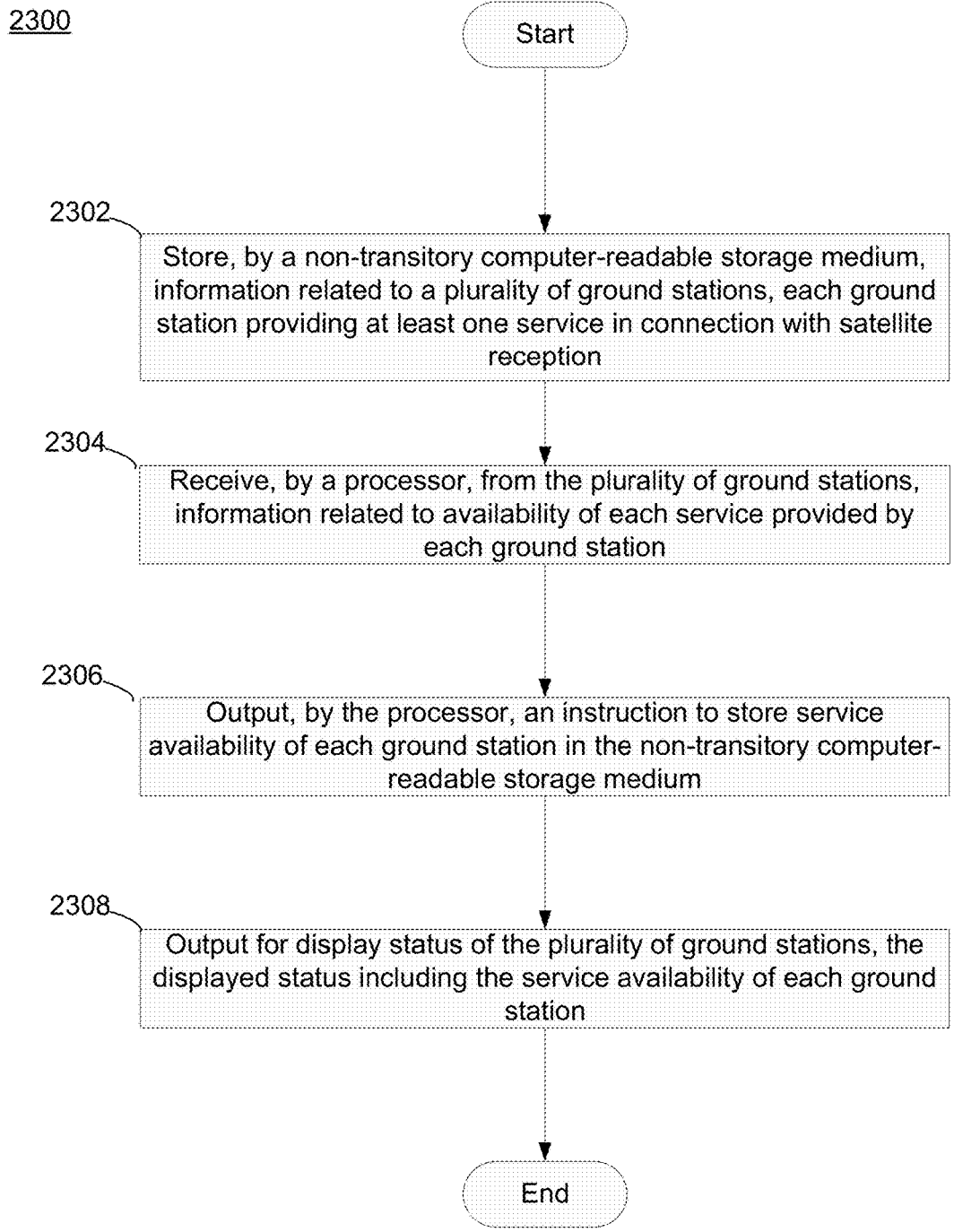
FIG. 23 is a flowchart illustrating example steps that may be executed by a computing device to provide a graphical display of ground station information.

FIG. 23 is a flowchart 2300 illustrating example steps that may be executed by the computing device 180 to provide a graphical display of ground station information. At 2302, a non-transitory computer-readable storage medium may store information related to a plurality of ground stations. Each ground station may provide at least one service in connection with satellite reception. At 2304, a processor may receive, from the plurality of ground stations, information related to availability of each service provided by each ground station. At 2306, the processor may output an instruction to store service availability of each ground station in the non-transitory computer-readable storage medium. At 2308, the processor may output for display status of the plurality of ground stations. The displayed status may include the service availability of each ground station. An example of such displayed status is illustrated in FIG. 14.

In one embodiment, the displayed status may include an identification associated with each ground station. In one embodiment, the displayed status may include a hostname associated with each ground station. In one embodiment, the displayed status may include processor information associated with each ground station. In one embodiment, the displayed status may include memory information associated with each ground station. In one embodiment, the processor may receive the information related to availability of each service provided by each ground station at real time or quasi real time.

Figure 24:
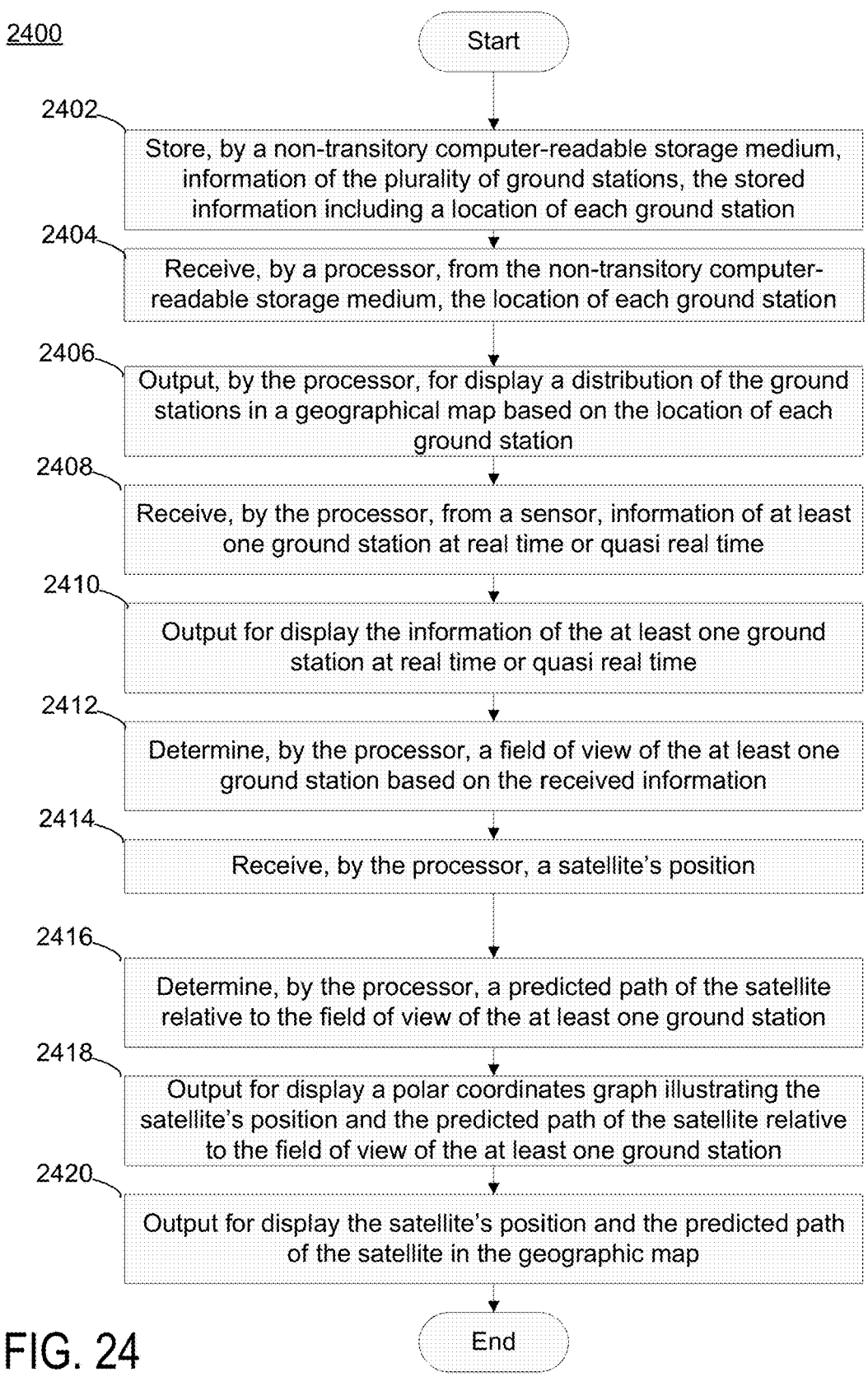
FIG. 24 is a flowchart illustrating example steps that may be executed by a computing device to provide a graphical display of information related to a plurality of ground stations.

FIG. 24 is a flowchart 2400 illustrating example steps that may be executed by the computing device 180 to provide a graphical display of information related to a plurality of ground stations. At 2402, a non-transitory computer-readable storage medium may store information of the plurality of ground stations. The stored information may include a location of each ground station. At 2404, a processor may receive, from the non-transitory computer-readable storage medium, the location of each ground station. At 2406, the processor may output for display a distribution of the ground stations in a geographical map based on the location of each ground station. At 2408, the processor may receive, from a sensor, information of at least one ground station at real time or quasi real time. At 2410, the processor may output for display the information of the at least one ground station at real time or quasi real time. At 2412, the processor may determine a field of view of the at least one ground station based on the received information. At 2414, the processor may receive a satellite's position. At 2416, the processor may determine a predicted path of the satellite relative to the field of view of the at least one ground station. At 2418, the processor may output for display a polar coordinates graph illustrating the satellite's position and the predicted path of the satellite relative to the field of view of the at least one ground station. At 2420, the processor may output for display the satellite's position and the predicted path of the satellite in the geographical map. An example of such displays maybe found in FIG. 6.

In one embodiment, the processor may output for display live statistics of the at least one ground station. In one embodiment, the processor may output for display weather information related to the at least one ground station. In one embodiment, the processor may output for display historical positions of the at least one ground station in a time sequence. In one embodiment, each historical position may include an elevation dimension and an azimuth dimension. In one embodiment, the historical positions may include positions of a rotor of the at least one ground station. The rotor may adjust the field of view of the at least one ground station. In one embodiment, the processor may construct a visual representation, in an overlay manner, illustrating the ground station at a correctly calibrated position and also illustrating the visual information of the at least one ground station at real time or quasi real time. In one embodiment, the correctly calibrated position may include an elevation dimension and an azimuth dimension. In one embodiment, the processor may output the visual representation. In one embodiment, the visual information may include at least one of image and video formats. In one embodiment, the sensor may include an image sensor. In one embodiment, the sensor may include a camera. While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation. For example, the disclosed technology may be implemented in an aerospace device or system, including but not limited to, satellite communication systems of all sizes, and aircrafts including airplanes, jets, and air balloon, among other possibilities. The disclosed technology may serve multiple purposes, including monitoring maritime activities, monitoring trade transit, general aviation, commercial and private purposes including transport and cargo services, and military purposes, among other possibilities.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computerusable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for managing a ground station that tracks a satellite, comprising:
    a non-transitory computer-readable storage medium configured to store information of the ground station at a first position at a first time, the ground station defining a field of view within which to receive radio waves from a satellite, the ground station including a rotor to adjust the field of view; and
    a processor in communication with the non-transitory computer-readable storage medium, the processor configured to:
       receive, from a sensor, information of the ground station at a second position at a second time;
       output an instruction to store the information of the ground station at the second position at the second time in the non-transitory computer-readable storage medium to develop a time based record of the ground station;
       detect an anomaly of a positional characteristic of the ground station based on a difference between the first position and the second position;
       determine a need to calibrate the ground station based on the detected anomaly; and
       output a signal indicative of the need.

2. The system of claim 1, wherein the first position and the second position of the ground station each include an elevation dimension and an azimuth dimension.

3. The system of claim 1, wherein the processor is configured to display a graphical illustration of the ground station at the first position and at the second position in an overlay manner.

4. The system of claim 1, wherein the processor outputs the signal to calibrate the rotor based on the detected anomaly.

5. The system of claim 1, wherein the processor outputs the signal to alert a user to calibrate the ground station.

6. The system of claim 1, wherein the information of the ground station at the second position at the second time is visual information.

7. A method for managing a ground station that tracks a satellite, comprising:
    storing, by a non-transitory computer-readable storage medium, information of the ground station at a first position at a first time, the ground station defining a field of view within which to receive radio waves from a satellite, the ground station including a rotor to adjust the field of view;
    receiving, by a processor, the stored information of the ground station at the first position;
    receiving, by the processor, from a sensor, information of the ground station at a second position at a second time;
    outputting, by the processor, an instruction to store the information of the ground station at the second position at the second time in the non-transitory computer-readable storage medium to develop a time based record of the ground station;
    detecting, by the processor, an anomaly of a positional characteristic of the ground station based on a difference between the first position and the second position;
    determining, by the processor, a need to calibrate the ground station based on the detected anomaly; and
    outputting, by the processor, a signal indicative of the need.

8. The method of claim 7, wherein the processor outputs the signal to calibrate the ground station based on the detected anomaly.

9. The method of claim 7, wherein the processor outputs the signal to alert a user to calibrate the ground station.

10. The method of claim 7, wherein the information of the ground station at the second position at the second time is visual information.

11. A system for providing a graphical display of information related to a satellite reception device, the reception device changing from a first position at a first time to a second position at a second time, comprising:
    a non-transitory computer-readable storage medium configured to store information of the reception device at the first position; and
    a processor in communication with the non-transitory computer-readable storage medium, the processor configured to:
       receive, from the non-transitory computer-readable storage medium, the stored information of the reception device at the first position;
       receive, from a sensor, information of the reception device at the second position;
       construct a visual representation of the reception device at the first position and the reception device at the second position in an overlay manner; and
       output for display the visual representation,
       determine a degree of miscalibration based on a difference between the first position and the second position, the first position being correctly calibrated position, and the second position being an incorrectly calibrated position.

12. The system of claim 11, wherein the first position and the second position of the reception device each include an elevation dimension and an azimuth dimension.

13. The system of claim 11, wherein the stored information of the reception device at the first position includes visual information, wherein the visual information includes at least one of image and video formats.

14. The system of claim 11, wherein the sensor includes an image sensor, and wherein the image sensor includes a camera.

15. The system of claim 11, wherein the visual representation distinguishes the reception device at the first position from the reception device at the second position.

16. The system of claim 11, wherein the processor outputs an instruction to calibrate the reception device based on the determined degree of miscalibration.

17. The system of claim 11, wherein the processor outputs for display an instruction to a user to calibrate the reception device.

18. The system of claim 11, wherein the correctly calibrated position is associated with predetermined elevation and azimuth values.

19. The system of claim 11, wherein the reception device is a ground station.

20. The system of claim 11, wherein the reception device defines a field of view within which the reception device receives radio waves from a satellite, and the reception device includes a rotor to adjust the field of view.

21. The system of claim 20, wherein the processor outputs an instruction to calibrate the rotor based on a difference between the first position and the second position.

22. The system of claim 11, wherein the information of the reception device at the second position is visual information.

23. A method for providing a graphical display of information related to a satellite reception device that changes from a first position at a first time to a second position at a second time, comprising:
    storing, by a non-transitory computer-readable storage medium, information of the reception device at the first position;
    receiving, by a processor, the stored information of the reception device at the first position;
    receiving, by the processor, from a sensor, information of the reception device at the second position;
    constructing, by the processor, a visual representation of the reception device at the first position and the reception device at the second position in an overlay manner;
    outputting for display the visual representation; and
    determining a degree of miscalibration based on a difference between the first position and the second position, the first position being correctly calibrated position, and the second position being an incorrectly calibrated position.

24. The method of claim 23, wherein the information of the reception device at the second position is visual information.

25. A system for providing a graphical display to manage a satellite reception device that tracks a satellite, the reception device defining a field of view within which the reception device receives radio waves from the satellite, comprising:
    a processor configured to:
        receive a satellite's position;
        receive, from a sensor, information of the reception device including positional information of the reception device;
        determine a field of view of the reception device based on the received information;
        determine a predicted path of the satellite relative to the field of view of the reception device;
        output for display a polar coordinates graph illustrating the satellite's position and the predicted path of the satellite relative to the field of view of the reception device; and
        output a signal to calibrate the reception device.

26. The system of claim 25, wherein the information of the reception device is visual information.

27. The system of claim 25, wherein the positional information of the reception device includes an elevation dimension and an azimuth dimension.

28. The system of claim 25, wherein the reception device includes a rotor to adjust the field of view.

29. The system of claim 25, wherein the processor is configured to determine elevation and azimuth information of the reception device based on the information of the reception device.

30. The system of claim 25, wherein the processor is configured to output a signal to alert a user to calibrate the reception device.

31. The system of claim 25, wherein the processor is configured to receive the satellite's position and the information of the reception device at real time or quasi real time.

32. The system of claim 25, wherein the processor is configured to output for display an updated polar coordinates graph illustrating an updated satellite's position and an updated predicted path of the satellite relative to an updated field of view of the reception device.

33. A method for providing a graphical display to manage a satellite reception device that tracks a satellite, the reception device defining a field of view within which the reception device receives radio waves from the satellite, comprising:
    receiving, by a processor, a satellite's position;
    receiving, by the processor, from a sensor, information of the reception device including positional information of the reception device;
    determining, by the processor, a field of view of the reception device based on the received information;
    determining, by the processor, a predicted path of the satellite relative to the field of view of the reception device;
    outputting for display a polar coordinates graph illustrating the satellite's position and the predicted path of the satellite relative to the field of view of the reception device; and
    output a signal to calibrate the reception device.

34. The method of claim 33, wherein the information of the reception device is visual information.

35. A system for providing a graphical display of information related to a plurality of ground stations, comprising:
    a non-transitory computer-readable storage medium configured to store information of the plurality of ground stations, the stored information relating to information of a plurality of positions exhibited by each ground station throughout a time frame, each ground station defining a field of view within the ground station receives radio waves from a satellite, and the ground station including a rotor to adjust the field of view; and a processor in communication with the non-transitory computer-readable storage medium, the processor configured to:
- receive an input by a user selecting at least one ground station;
- receive an input by the user selecting a point in the time frame associated with the selected ground station;
- retrieve from the non-transitory computer-readable storage medium a position of the selected ground station corresponding to the selected point in the time frame; and
- output for display a visual representation of the selected ground station exhibiting the retrieved position at the selected point in the time frame.

36. The system of claim 35, wherein the stored information is visual information of the plurality of positions exhibited by each ground station throughout the time frame.

37. The system of claim 35, wherein each position of each ground station includes an elevation dimension and an azimuth dimension.

38. The system of claim 35, wherein the stored information in the non-transitory computer-readable storage medium includes visual information of each ground station at a correctly calibrated position.

39. The system of claim 38, wherein the processor is configured to construct a visual representation of the selected ground station at the selected point in the time frame and at the correctly calibrated position in an overlay manner.

40. The system of claim 39, wherein the processor is configured to output for display the constructed visual representation.

41. The system of claim 35, wherein the processor is configured to:
- retrieve from the non-transitory computer-readable store medium positions of the selected satellite subsequent to the selected point in the time frame; and
- output for display, in a time sequence, a visual representation of the selected satellite exhibiting the retrieved positions sequent to the selected point in the time frame.

42. The system of claim 35, wherein the positions of each ground station include positions of the rotor associated with the ground station.

43. A method for providing a graphical display of information related to a plurality of ground stations, comprising:
- storing, by a non-transitory computer-readable storage medium, information of the plurality of ground stations, the stored information relating to information of a plurality of positions exhibited by each ground station throughout a time frame, each ground station defining a field of view within the ground station receives radio waves from a satellite, and the ground station including a rotor to adjust the field of view;
- receiving, by a processor, an input by a user selecting at least one ground station;
- receiving, by the processor, an input by the user selecting a point in the time frame associated with the selected ground station;
- retrieving, by the processor, from the non-transitory computer-readable storage medium a position of the selected ground station corresponding to the selected point in the time frame; and
- outputting, by the processor, for display a visual representation of the selected ground station exhibiting the retrieved position at the selected point in the time frame.

44. The method of claim 43, wherein the stored information is visual information of the plurality of positions exhibited by each ground station throughout the time frame.

45. A system for providing a graphical display of information related to a plurality of ground stations, comprising:
- a plurality of ground stations;
- a non-transitory computer-readable storage medium configured to store information of the plurality of ground stations, the stored information including a location of each satellite reception device; and
- a processor in communication with the non-transitory computer-readable storage medium, the processor configured to:
  - receive, from the non-transitory computer-readable storage medium, the location of each ground station; and
  - output for display a distribution of the ground stations in a geographical map based on the location of each ground station.

46. The system of claim 45, wherein each ground station defines a field of view within which the ground station receives radio waves from a satellite.

47. The system of claim 46, wherein the processor is configured to output for display at least one satellite in the geographical map within a field of view of at least one of the ground stations.

48. The system of claim 45, wherein the processor is configured to receive information about at least one satellite, the received information including a location of the at least one satellite.

49. The system of claim 48, wherein the processor is configured to output for display the at least one satellite in the geographical map based on the location of the at least one satellite.

50. The system of claim 48, wherein the processor is configured to predict a path of the at least one satellite.

51. The system of claim 50, wherein the processor is configured to output for display the predicted path of the at least one satellite in the geographical map.

52. A method for providing a graphical display of information related to a plurality of ground stations, comprising:
- storing, by a non-transitory computer-readable storage medium, information of the plurality of ground stations, the stored information including a location of each ground station, each ground station defining a field of view within which the ground station receives radio waves from a satellite;
- receiving, by a processor, from the non-transitory computer-readable storage medium, the location of each ground station;
- outputting, by the processor, for display a distribution of the ground stations in a geographical map based on the location of each ground station;
- outputting, by the processor, for display at least one satellite in the geographical map within a field of view of at least one of the ground stations; and
- receiving information about at least one satellite, the received information including a location of the at least one satellite.

53. A system for providing a graphical display of ground station information, comprising:
- a plurality of ground stations;
- a non-transitory computer-readable storage medium configured to store information related to the plurality of ground stations, each ground station providing at least one service in connection with satellite reception; and a processor in communication with the non-transitory computer-readable storage medium, the processor configured to:
- receive, from the plurality of ground stations, information related to availability of each service provided by each ground station;
- output an instruction to store service availability of each ground station in the non-transitory computer-readable storage medium; and
- output for display status of the plurality of ground stations, the displayed status including the service availability of each ground station.

54. The system of claim 53, wherein the displayed status includes an identification associated with each ground station, a hostname associated with each ground station, processor information associated with each ground station, and memory information associated with each ground station.

55. The system of claim 53, wherein the processor is configured to receive the information related to availability of each service provided by each ground station at real time or quasi real time.

56. A method for providing a graphical display of ground station information, comprising:

- storing, by a non-transitory computer-readable storage medium, information related to a plurality of ground stations, each ground station providing at least one service in connection with satellite reception;

- receiving, by a processor, from the plurality of ground stations, information related to availability of each service provided by each ground station;

- outputting, by the processor, an instruction to store service availability of each ground station in the non-transitory computer-readable storage medium; and

- outputting for display status of the plurality of ground stations, the displayed status including the service availability of each ground station.

* * * * *